US011220882B2

(12) United States Patent
Nevison et al.

(10) Patent No.: US 11,220,882 B2
(45) Date of Patent: Jan. 11, 2022

(54) ENHANCING THERMAL CONDUCTIVITY OF A WELLBORE

(71) Applicant: Wise Intervention Services Inc., Calgary (CA)

(72) Inventors: Grant Nevison, Alberta (CA); Josh Thompson, Calgary (CA)

(73) Assignee: Element Coil Services Inc., Calgary (CA)

(*) Notice: Subject to any disclaimer, the term of this patent is extended or adjusted under 35 U.S.C. 154(b) by 0 days.

(21) Appl. No.: 16/472,871

(22) PCT Filed: Dec. 18, 2017

(86) PCT No.: PCT/CA2017/051528
§ 371 (c)(1),
(2) Date: Jun. 22, 2019

(87) PCT Pub. No.: WO2018/112611
PCT Pub. Date: Jun. 28, 2018

(65) Prior Publication Data
US 2020/0190937 A1 Jun. 18, 2020

Related U.S. Application Data

(60) Provisional application No. 62/438,941, filed on Dec. 23, 2016.

(51) Int. Cl.
*E21B 33/14* (2006.01)
*C09K 8/42* (2006.01)
(Continued)

(52) U.S. Cl.
CPC .............. *E21B 33/14* (2013.01); *C09K 8/426* (2013.01); *E21B 33/12* (2013.01); *E21B 43/267* (2013.01);
(Continued)

(58) Field of Classification Search
CPC ........ E21B 33/14; E21B 33/12; E21B 43/267; C09K 8/426; C09K 2208/10; F21B 43/267; F24T 2010/53
See application file for complete search history.

(56) References Cited

U.S. PATENT DOCUMENTS 3,747,678 A * 7/1973 Waid ................. C09K 8/56
166/295
7,216,711 B2 * 5/2007 Nguyen ................. C09K 8/62
166/308.1

(Continued)

FOREIGN PATENT DOCUMENTS

WO 2009/151649 A2 12/2009
WO 2012/079078 A2 6/2012

OTHER PUBLICATIONS

"Abandoned Oil/Gas Wells as Sustainable Sources of Renewable Energy", Templeton, et al., Energy 2014, vol. 70, pp. 366-373.
"Three Dimensional Modeling of Heat Extraction from Abandoned Oil Well for Application in Sugarcane Industry in Ahvaz-Southern Iran", Proceedings World Geothermal Congress 2015, Melbourne, Australia, Apr. 19-25, 2015.

(Continued)

*Primary Examiner* — Silvana C Runyan
(74) *Attorney, Agent, or Firm* — Troutman Pepper Hamilton Sanders LLP; Ryan A. Schneider

(57) ABSTRACT

A method for recompleting a well is applied to a well such that the recompleted well can thermally transfer geothermal energy to surface. The recompleting method can comprise steps to enhance the thermal conductivity of a wellbore of a hydrocarbon well, by inserting a thermal material into the wellbore that displaces a reservoir fluid having a lower thermal conductivity than the thermal material. The recompleting method can also comprise steps to enhance the thermal conductivity of a reservoir in which the wellbore is (Continued)

located by inserting a thermal material into the reservoir that displaces a reservoir fluid having a lower thermal conductivity than the thermal material, or in which the reservoir is fractured, and a thermal material is inserted into created fractures.

25 Claims, 11 Drawing Sheets

(51) Int. Cl.
*E21B 33/12* (2006.01)
*E21B 43/267* (2006.01)
*F24T 10/00* (2018.01)
(52) U.S. Cl.
CPC ....... *C09K 2208/10* (2013.01); *F24T 2010/53* (2018.05)

(56) References Cited

U.S. PATENT DOCUMENTS

| 7,237,609 | B2* | 7/2007 | Nguyen | C09K 8/508 |
| | | | | 166/280.2 |
| 2005/0274510 | A1* | 12/2005 | Nguyen | E21B 43/267 |
| | | | | 166/250.12 |
| 2011/0247816 | A1* | 10/2011 | Carter, Jr. | E21B 7/28 |
| | | | | 166/298 |
| 2016/0003021 | A1* | 1/2016 | Nelson | E21B 33/124 |
| | | | | 166/280.2 |

OTHER PUBLICATIONS

International Search Report and Written Opinion in PCT Application PCT/CA2017/051528, dated Jun. 22, 2019.

* cited by examiner

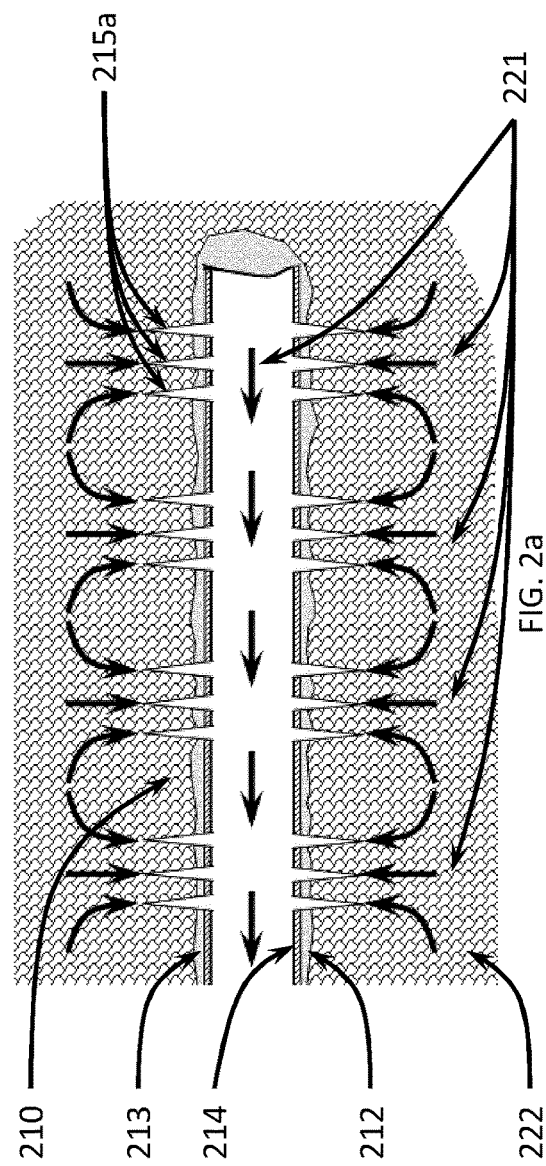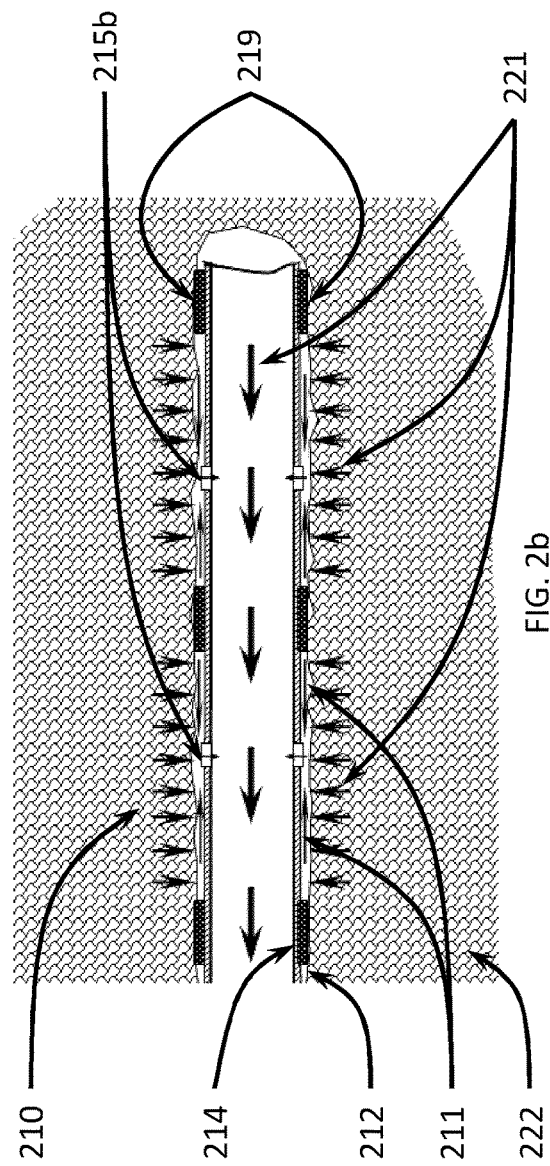

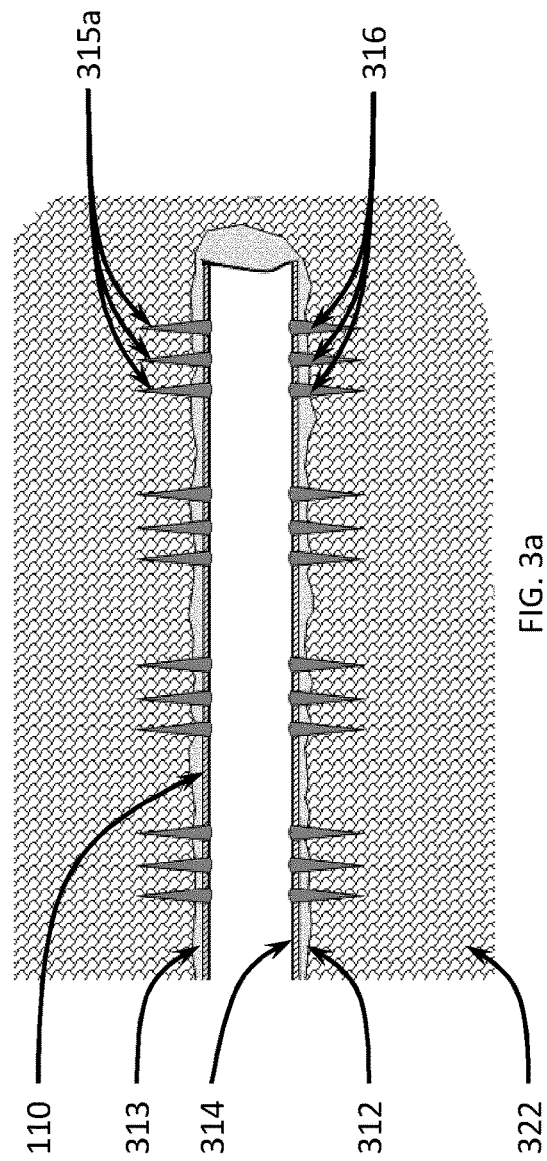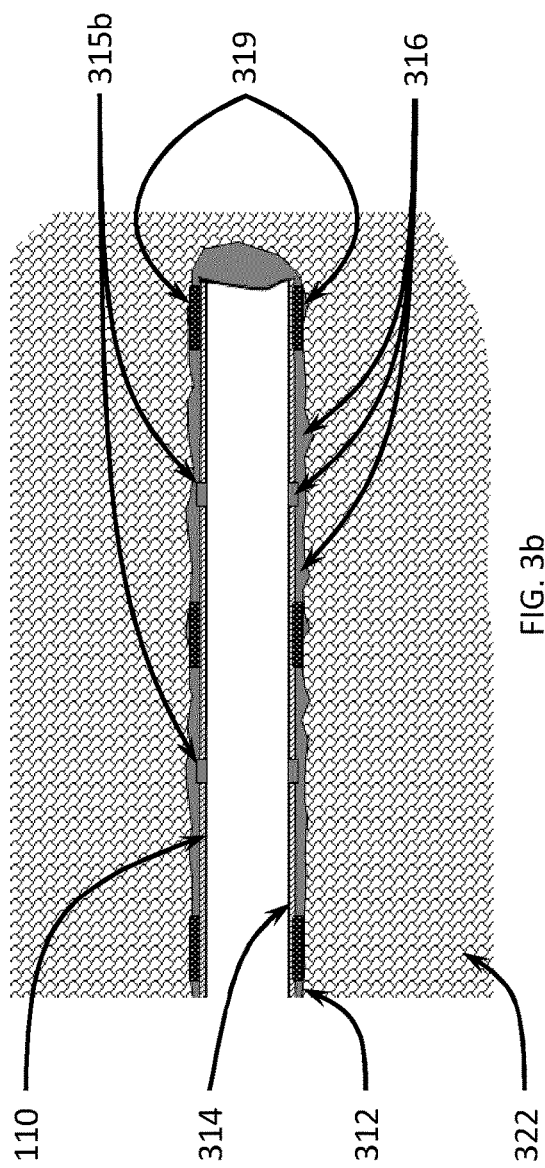

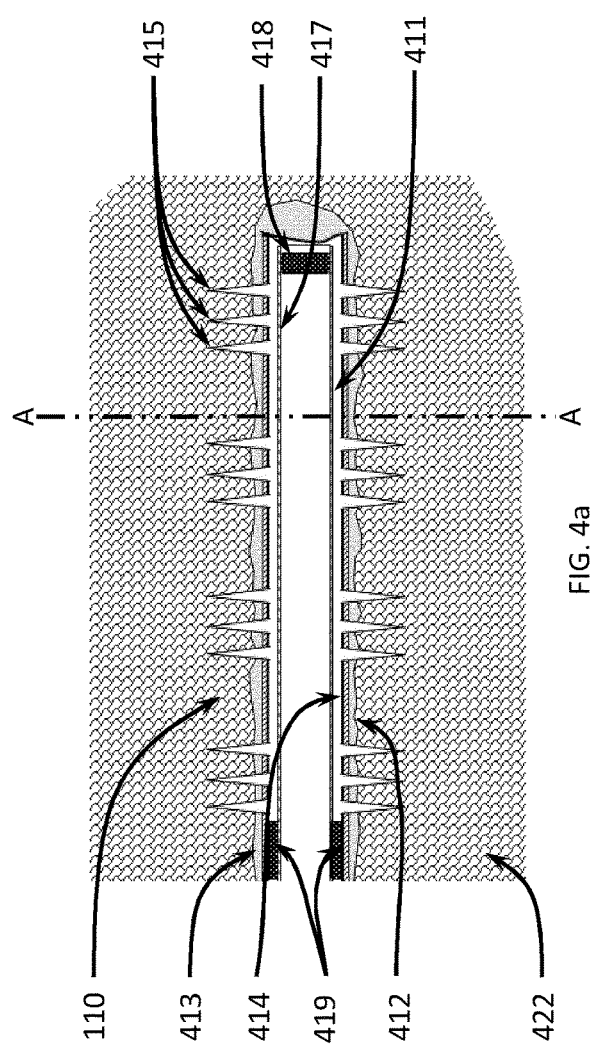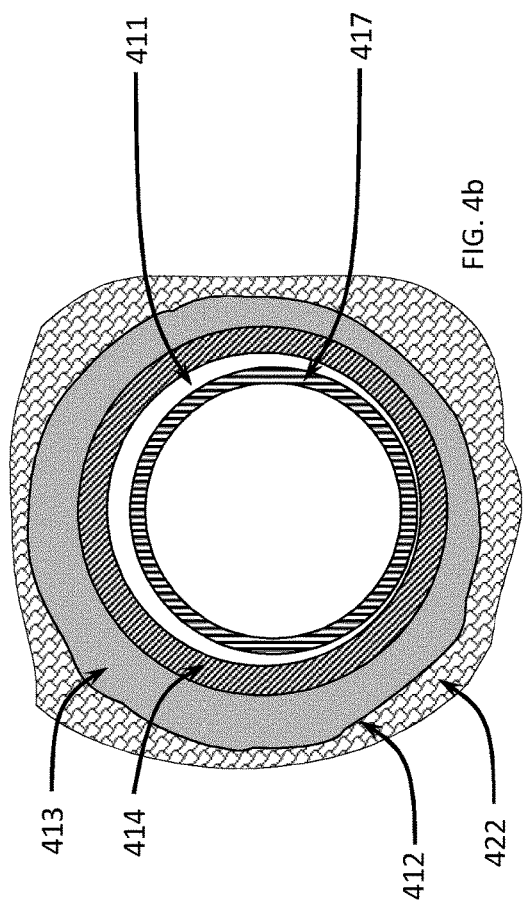

ENHANCING THERMAL CONDUCTIVITY OF A WELLBORE

FIELD

This disclosure relates generally to methods and systems for enhancing geothermal energy production from a well, such as from a wellbore of a hydrocarbon well.

BACKGROUND

Many hydrocarbon wells that are no longer economic to produce hydrocarbons are still mechanically and hydraulically sound. Conventionally, these wells are abandoned, and steps must be taken to prevent the well from being a hazard to the public and environment.

There have been proposals about extending the economic usefulness of hydrocarbon-depleted wells by redeploying the wells to capture geothermal energy. The redeployment of hydrocarbon-unproductive wells for geothermal energy production is often proposed in a single wellbore that can form a closed system. This single well deployment method advantageously creates a closed system. A closed system allows a heat transfer fluid to flow into and out of the wellbore without being fouled by contaminated reservoir fluids, and can reduce environmental contamination via unplanned surface release or inadvertent injection into an aquifer.

There are a wide-ranging variety of single wellbore hydrocarbon wells that may be suitable for geothermal energy recompletion. Well vertical depths are commonly within the range of 1,500 m to 3,500 m, with some wells exceeding 5,000 m in depth. Within the vertical or horizontal portion of a well, the number of perforated intervals or ports along a wellbore commonly number between one to forty, and the intervals may extend over a 2 m to 4,500 m distance across or along a productive reservoir zone. Most oil and gas is produced from wells of moderate depth where the bottom hole temperatures in geothermal terms are low. Typical geothermal temperatures are well in excess of 130° C. while the majority of oil and gas wells are shallow and exhibit lower bottom hole temperatures. Geothermal temperatures increase with depth and thus circulation to the full depth of the well is desirable to maximize geothermal energy capture. Notably, in most wells, the producing reservoir is at or near the full depth of the well. Also, many wells are drilled horizontally through the producing reservoir where circulation along the horizontal portion of the well may significantly improve the heat delivery capacity of the well.

Maintaining circulating heat transfer fluids solely within the wellbore beneficially simplifies the process of gaining heat from the earth. Primarily, the heat transfer fluids will not be contaminated by reservoir fluids or soluble rock materials, or lost within the reservoir or cause contamination to aquifers. In additional to avoiding contamination and fouling, circulating a heat transfer fluid solely with the wellbore permits a greater selection of a heat transfer fluid that is optimized for heat recovery or energy processing. The closed system that is created by circulating solely within the wellbore requires complete hydraulic isolation between the circulated fluid and the earth. Notably, the hydraulic isolation required for geothermal energy production is different than in hydrocarbon production, where the well must be in fluid communication with the reservoir in order to flow hydrocarbons from the reservoir to surface.

There are other aspects of hydrocarbon well construction and configuration that are typically in conflict with using the well for geothermal energy production. For example, hydrocarbon wellbores are sized primarily to meet hydrocarbon production flow requirements, and are typically at a minimum diameter suitable for geothermal energy production. Heat transmission through a small diameter wellbore is restrictive and thus heat flow is reduced. Further, hydrocarbon well casing cements are relatively poor thermal conductors and thus tend inhibit heat flow. Also, casing strings are often not fully cemented, poorly cemented or cemented with a high yield, low density cement, which tend to further reduce heat flow. Finally, fluid circulation in small diameter wellbores having a return flow tubing in place is often prone to high friction pressures.

Challenges exist with achieving hydraulic isolation while maintaining thermal performance, improving thermal yields from wellbores, achieving effective hydraulic isolation in long completion intervals, selecting heat transfer fluids to improve thermal and transport efficiencies, balancing returning fluid wellbore heat with circulating energy consumption, and effectively integrating electrical generation systems with a constantly declining energy source. It is therefore an objective to provide a method for recompleting a well for geothermal energy production that addresses at least some of these challenges.

SUMMARY

According to one aspect of the invention, there is provided a method for recompleting a well to produce geothermal energy. The method comprises inserting a hydraulically isolating means into a wellbore of the well such that an interior portion of the wellbore is hydraulically isolated from an adjacent reservoir. The hydraulically isolating means comprises a thermal material that displaces a reservoir fluid in the wellbore, and wherein the thermal material has a higher thermal conductivity than the reservoir fluid. More particularly, the thermal material can have a thermal conductivity that is at least 15% greater than the thermal conductivity of the reservoir fluid.

In one aspect, the thermal material is settable, in which case the method further comprises: placing the settable thermal material into at least one wellbore casing opening that is in fluid communication with the adjacent reservoir, such that the reservoir fluid is displaced from the at least one wellbore casing opening and the at least one wellbore casing opening is hydraulically sealed; then setting the settable thermal material such that the a fluid impermeable barrier is formed in the at least one wellbore casing opening. The settable thermal material can be selected from a group consisting of cement, polymer, and resin. A packer tool can be conveyed to a target location in the wellbore comprising the at least one wellbore casing opening, and then the settable thermal material is circulated from the tool and into the at least one wellbore casing opening. The well can comprise an uncemented wellbore casing and a borehole, in which case the method further comprises circulating the settable thermal material into a borehole annular space between the wellbore casing and the borehole such that the reservoir fluid in the borehole annular space is displaced, then setting the settable thermal in the at least one wellbore casing opening and the borehole annular space.

In another aspect, the hydraulically isolating means further comprises a fluid impermeable mechanical flow barrier that is placed inside the wellbore such that the interior portion of the wellbore is hydraulically isolated from the adjacent reservoir, and the thermal material is a fluid that is placed in between the mechanical flow barrier and a wellbore casing of the wellbore. In particular, the mechanical flow barrier can be a conduit selected from a group consisting of casing patches, liners, and isolation strings, and the hydraulically isolated interior portion is the inside of the conduit.

The mechanical flow barrier conduit can be conveyed to a target location in the wellbore, and at least one packer can be placed between the mechanical flow barrier conduit and the wellbore casing, and a plug-type packer can be placed inside the mechanical flow barrier conduit at a distal end thereof, such that the interior of the mechanical flow barrier conduit is hydraulically isolated from the rest of the wellbore. The well can comprise an uncemented wellbore and a borehole, in which case the method further comprises placing the thermal material fluid into a borehole annular space between the wellbore casing and the borehole such that the reservoir fluid in the borehole annular space is displaced. The thermal material fluid can be settable, in which case the method further comprises setting the settable thermal material in the borehole annular space.

The thermal material can comprises a gaseous or a liquid fluid selected from a group consisting of: water, aqueous solutions, alcohols, light hydrocarbons, natural gas liquids, ketones, ammonia, nitrogen, methane, ethane and carbon dioxide. Also, the thermal material can be a mixture comprising a carrier fluid and a solid having a higher thermal conductivity than the reservoir fluid. The solid can be selected from a group consisting of: oxide ceramics, nitride/carbide ceramics, metals, metal alloys, graphite, graphene, carbon nano-tubes, silicon and silicon dioxide. The mixture can further comprise an additive comprising one or more of: settable materials, viscosifiers, surfactants and solutes. The thermal material can be a thin fluid containing nanoparticles selected from a group consisting of: alumina, copper oxide, magnetite, zinc oxide, aluminum oxide, aluminum nitride, silicon carbide, copper, silver, iron, aluminum, silica, tin oxide, aluminum copper alloy, silver aluminum alloy, single and multi-walled carbon nanotubes, grapheme, and grapheme oxide nanosheets. The thermal material can further comprise a carrying fluid selected from a group consisting of water, alcohols, light hydrocarbons, ketones and carbon dioxide.

Prior to inserting the hydraulically isolating means into the wellbore, additional thermal material can be placed into rock openings in the adjacent reservoir, wherein the additional thermal material has a higher thermal conductivity than the reservoir fluid. Alternatively, prior to inserting the hydraulically isolating means into the wellbore, rock in the adjacent reservoir can be fractured, and then additional thermal material can be placed into rock fractures created by the hydraulic fracturing. The additional thermal material has a higher thermal conductivity than the adjacent reservoir rock. The placing of the additional thermal material in the rock opening or fractures can displace reservoir fluid in the rock openings or fractures.

Prior to inserting the hydraulically isolating means into the wellbore, additional thermal material can be placed into pores of fracturing sand or proppant within an existing propped fracture network in the adjacent reservoir, wherein the additional thermal material has a higher thermal conductivity than the reservoir fluid.

BRIEF DESCRIPTION OF THE FIGURES

FIGS. 2(a) and (b) is are schematic side section views illustrating perforations in a casing of a wellbore of the well prior to recompletion.

FIGS. 3(a) and (b) are schematic side section views illustrating the perforations in the casing sealed with a settable material applied during one embodiment of the recompletion method.

FIGS. 4(a) and (b) are schematic side and end section views illustrating the perforations in the casing sealed with a mechanical isolation device during another embodiment of the recompletion method.

DETAILED DESCRIPTION

Overview

Figure 1:
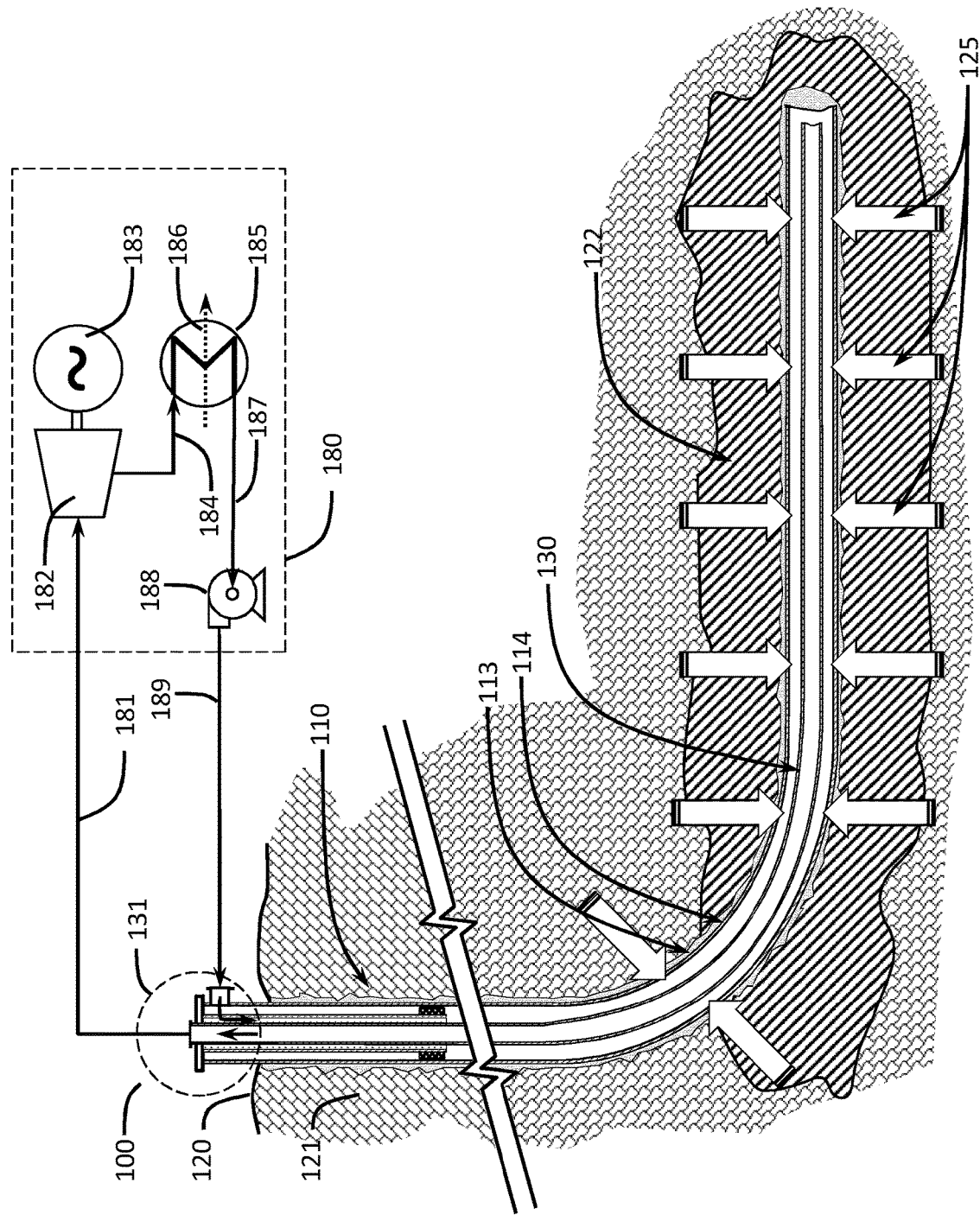
FIG. 1 is a schematic side sectional view of a hydrocarbon well that has been recompleted to produce geothermal energy by a recompletion method according to an embodiment of the invention.

The embodiments described herein relate to a method for recompleting a well such that the recompleted well can thermally transfer geothermal energy to surface. In some embodiments, the recompleting method comprises steps to enhance the thermal conductivity of a wellbore of a hydrocarbon well by inserting a thermal material into the wellbore that displaces a reservoir fluid having a lower thermal conductivity than the thermal material. In some other embodiments, the recompleting method comprises steps to enhance the thermal conductivity of a reservoir in which the wellbore is located by inserting a thermal material into the reservoir that displaces a reservoir fluid having a lower thermal conductivity than the thermal material. In other embodiments, the recompleting method comprises steps to enhance the thermal flow from a reservoir in which the wellbore is located by inserting a thermal material into the reservoir to form a highly conductive path to the wellbore with a thermal material of conductivity that is greater than that of the reservoir rock itself. In yet some other embodiments, the recompleting method comprises enhancing the thermal conductivity in both the wellbore and the reservoir.

In some of the embodiments which enhance the thermal conductivity of the wellbore, the wellbore is hydraulically isolated by placing one or more settable thermal materials into openings in the wellbore casing. The settable thermal materials can be applied using a cup packer or a straddle, and can be selected based on their thermal conductivity. In some other embodiments, the wellbore is hydraulically isolated by placing a mechanical flow barrier in the wellbore, such as by placing as a conduit comprised of casing patches, liners or isolation string along an interval of wellbore casing, or by placing an expandable tubular conduit. A thermal material fluid is placed in an annular gap between the mechanical flow barrier and the wellbore casing. The mechanical flow barrier can be a cylindrical conduit configured to minimize the size of the annular gap, which is expected to improve thermal performance of the thermal material fluid flowing through the annular gap.

In some of the embodiments which enhance thermal performance in the reservoir, the method comprises flowing one or more selected thermal material into the pores, fissures and/or fractures of the reservoir rock surrounding the wellbore, then hydraulically isolating the wellbore with a hydraulic isolation means, wherein the hydraulic isolation means can optionally include a thermal material. The thermal materials can be a gaseous or a liquid fluid, and can include: water or aqueous solutions, alcohols, light hydrocarbons, natural gas liquids, ketones, ammonia, nitrogen, methane, ethane and carbon dioxide. The thermal material fluid can be combined with other thermally active materials at a selected concentration to enhance behavior of the resulting thermal material. The thermal material can also be a mixture comprising a carrier fluid and one or more thermal components carried by the carrier fluid. The thermal components can be solids and be comprised of one or more of: oxide ceramics, nitride/carbide ceramics, metals, metal alloys, graphite, graphene, carbon nano-tubes, silicon and silicon dioxide. The thermal material fluid or mixture can also contain additives, including: settable materials, viscosifiers, surfactants and solutes. The thermal material is injected into the well at determined conditions and selectively placed into or around the wellbore or reservoir to manipulate the thermal flow into the circulating fluid and to hydraulically isolate the wellbore. As will discussed in greater detail below, the composition and behavior of the thermal material along with the composition and concentration of the thermal components and additives contained are manipulated to create desired thermal behaviors of the wellbore and reservoir during geothermal production.

In some embodiments which enhance thermal performance in the reservoir, existing reservoir fluids inside the reservoir rock are displaced by a flow of the thermal material, wherein the reservoir fluids have a lower thermal conductivity than the displacing thermal material. The reservoir fluids can be relatively low thermal conductivity hydrocarbon fluids and the displacing thermal material can be water, or an aqueous mixture comprising high thermal conductivity particles, solutes, precipitates and slurries. The mixture can also contain viscosifying chemicals to enhance transfer particle transport, viscosity breaking chemicals that cause a liquid portion of the aqueous mixture to readily disperse following placement, and surfactants which reduce surface tension thereby enhancing entry of the aqueous mixture into the reservoir rock.

In some other embodiments which enhance thermal performance in the reservoir, the method comprises placing a thermal material into pores of fracturing sand or proppant within an existing propped fracture network or other enhanced porosity reservoir space, such that a high thermally conductive network in the reservoir is formed. Reservoir fluids (e.g. water, hydrocarbons or mixtures thereof) in the pores or fractures are displaced by the thermal materials, and have a lower thermal conductivity than the displacing thermal materials. In yet some other embodiments, the method comprises inducing hydraulic fractures in the reservoir rock, then placing thermal materials into the created fractures such that a high thermal conductivity network is established within the reservoir to allow thermal flow from the reservoir and through the established network to the wellbore.

The steps of the recompleting method are not only applicable to recompleting oil and gas wells. Alternatively, a method for enhancing geothermal energy production using at least some of the steps of the recompleting method can be applied to other closed system wells to produce geothermal energy.

Definitions

As used in this disclosure, "well" includes a wellbore, a borehole, surrounding rock, a casing and other tubing conduits within the wellbore, cement or other material placed in the borehole during construction, former producing oil and gas reservoirs, materials or flow enhancements placed into the reservoirs to enhance hydrocarbon production, and the formation intervals utilized for geothermal heat.

As used in this disclosure, "reservoir fluids" means liquids and gases present within void spaces of the reservoir or sourced from the reservoir upon ending hydrocarbon production from the well. These fluids may include hydrocarbons and waters native to the reservoir or surrounding reservoirs. Additionally, "reservoir fluids" may also include those fluids present within the reservoir placed to support or manage hydrocarbon production from the well such as those applied for primary, secondary, tertiary or thermal hydrocarbon recovery, or remaining from well production stimulation or conformance control operations.

As used in this disclosure "void spaces" means gaps, openings, cavities, holes, hollows, craters, nooks, fissures, cracks, pores or other spaces within the wellbore or reservoir and occupied by liquids or gases. "Void spaces" may include perforations, perforation tunnels, wellbore annular spaces, reservoir matrix porosity, stimulation induced and etched porosity, abraded porosity, wormholes, solution induced porosity, porosity within existing hydraulic fractures, opened natural cracks or fractures and induced cracks, fractures or fissures.

As used in this disclosure, "thermal material" means one or a combination of materials that have a thermal conductivity that is higher than the thermal conductivity of the reservoir fluid displaced by the thermal material as a result of the recompletion method. Preferably, the thermal material has a thermal conductivity that is at least 15% higher than the thermal conductivity of the displaced reservoir fluid or the adjacent reservoir rock. The thermal material can be a liquid, a mixture comprising a carrier fluid and one or more thermal components, or a solid, and may transition between those states during or after placement within a well.

As used in this disclosure, "thermal fluids" are thermal materials in liquid or slurry form that are placed within the well for the purpose of altering the thermal behavior of the well. Thermal fluids may comprise thickening additives to cause immediate or delayed viscosity development or transition into a solid or solid-like state. Thermal fluids may also comprise additives to enhance or control thermal flow or to restrict fluid flow into or within selected portions of the well. Thermal fluids may be a solids-free liquid or be a slurry containing solids to a concentration up to approximately 65 vol. % such that the slurry is able to flow for placement purposes.

As used in this disclosure, "thermal solids" are thermal materials in solid particle form, and are selected based at least on their thermal conductivity, particle size and transport related properties.

As used in this disclosure, "carrier fluids" are gases or liquids used to transport thermal components of a thermal material to a desired location within the well and are a component of the applied thermal material. The carrier fluids may contain thickening additives that cause immediate or delayed viscosity development or transition into a solid or solid-like state. Carrier fluid compositions that will result in a solid or solid-like state (binders) include those of selected settable resins, epoxies or other polymers. Carrier fluids may also contain additives to enhance or control flow into selected portions of the well. Carrier fluids may also serve as thermal fluids and may be used to suspend thermal solids in a dispersed state. In addition, the carrier fluid may remain with the thermal material after its placement, or flow away from the thermal material.

As used in this disclosure, "thickening and setting additives" are additives applied to enhance transport of thermal solids or to serve as settable materials to control movement of the thermal material once placed. The thickening and setting additives include industrial thickeners such as temporary or permanent soluble or dispersed polymers and surfactants. For example, polymers for water thickening include xanthan gum, guar gum, starch, carboxymethyl cellulose (CMC), polyanionic cellulose (PAC), hydroxyethyl cellulose (HEC), polyacrylamides, polyacrylates and visco-elastic surfactant gels. In most instances these materials can be further thickened or made rigid with the use of cross-linker chemicals to interlink the polymer strands and create a settable material. Cross-linker chemicals include chromium, titanium, zirconium, aluminum, borate salts and aldehydes. The thickening and setting additives also include chemicals to selectively break the viscosity of the thickeners. The thickening and setting additives also include lime cements, portland cements, oil well cement and gypsum cements. Thickening additives can perform to produce a settable material where the thickening performance is sufficient to prevent movement of the thermal material once placed.

EMBODIMENTS

Referring to FIG. 1 and according to a first embodiment, a recompleting method is applied to a hydrocarbon well (100) to recomplete the well (100) for geothermal energy production ("recompleted well"). The recompleted well (100) includes a wellbore (110) having a horizontal section; however recompleting method can be applied to a wellbore of other orientations, including vertical, inclined, deviated and horizontal. Once recompleted, the well (100) can be operated in a geothermal energy production operation to generate electricity using surface power generation equipment (180), which in this embodiment uses an Organic Rankin cycle. Alternatively, power producing equipment using other known electricity generating processes can be used such as: steam, Kolina Cycle, Rankin cycle. Also, the well (100) can be coupled to surface water heating equipment (not shown) to heat water for purposes other than generating electricity, for direct storage, or for conversion to a differing medium for storage, transport or transmission purposes.

The wellbore (110) penetrates the earth (120) into a subterranean rock formation (121) having a thermal reservoir formation (122) that contains recoverable geothermal energy exhibits an elevated temperature. The wellbore (110) is thermally and hydraulically coupled to the surface power generation equipment (180), which is configured to capture or utilize geothermal heat to create electricity. A casing string conduit (114) extends inside the wellbore to hydraulically isolate the interior of the wellbore (110) from the reservoir formation (122). The casing string conduit (114) is at least partially surrounded by a hydraulic isolation material, typically cement (113), to hydraulically isolate the various subterranean formations from one another and provide mechanical support. The casing string conduit (114) may be comprised of a number of differing continuous or overlapping conduits as is known in the art, including a surface casing, an intermediate casing, a production casing and a liner (not shown). The wellbore (110) is hydraulically isolated from the surrounding reservoir formation (122) but is thermally coupled to the higher temperature reservoir rock in the formation (122) to permit heat to flow (shown as arrows 125) into the wellbore (110). A hollow tubing string (130) extends from the surface and into the wellbore (110) and is laterally spaced from the casing string conduit (114). The tubing string (130) defines an annular flow path between the exterior of the tubing string 130 and the interior of the casing string conduit (114), and a central flow path through the interior of the tubing string (130). A heat transfer fluid, or "circulating fluid" can be injected into the annular flow path for flow downhole; thermal energy from the surrounding formation (122) is transferred to the heat transfer fluid, causing it to vaporize. The vaporized heat transfer fluid then flows upstream through the central flow path of the tubing string (130) to the surface and then through the power generation equipment (180). The tubing string (130) can include thermal insulation to minimize heat loss from the warmer fluid flowing upstream through the central flow path ("heated return fluid") to the cooler fluid flowing through the annular flow path. The wellbore (110) terminates at surface with a wellhead (131) which comprises a fluid injection port in fluid communication with the annular flow path, and a recovery port in fluid communication with the central flow path of the tubing string (130).

The power generation equipment (180) is hydraulically and thermally coupled to the well (110) via a fluid supply conduit (189) coupled to the fluid injection port and a fluid return conduit (181) coupled to the fluid recovery port. The power generation equipment (180) includes a turbine (182) which is fluid communication with the fluid return conduit (181). Within the turbine (182), the heated return fluid undergoes an isenthalpic expansion whereby the derived work is utilized to drive a mechanically coupled electric generator (183). The outlet of the turbine (182) directs the spent return fluid through a hydraulically coupled conduit (184) for circulation through a condenser assembly (185). The condenser assembly (185) serves to remove heat from the heat transfer fluid to cause condensation, which in this embodiment is by air cooling (186). The condensed heat transfer fluid exits the condenser assembly (185) via a coupled conduit (187) and flows to a circulation pump (188). Within the circulation pump (188) the liquid phase heat transfer fluid is re-pressured and injected into the annular flow path within the wellbore (110) via the fluid supply conduit (189) for circulation and thermal energy capture in the wellbore (110).

The wellbore (110) is thermally communicative with, but hydraulically isolated from the earth (120) (including the formation rock (122)) at elevated temperature. Heat energy is transferred along the entire wellbore segment between the surrounding thermal reservoir (122) and the wellbore (110) to the circulating heat transfer fluid.

Figure 11:
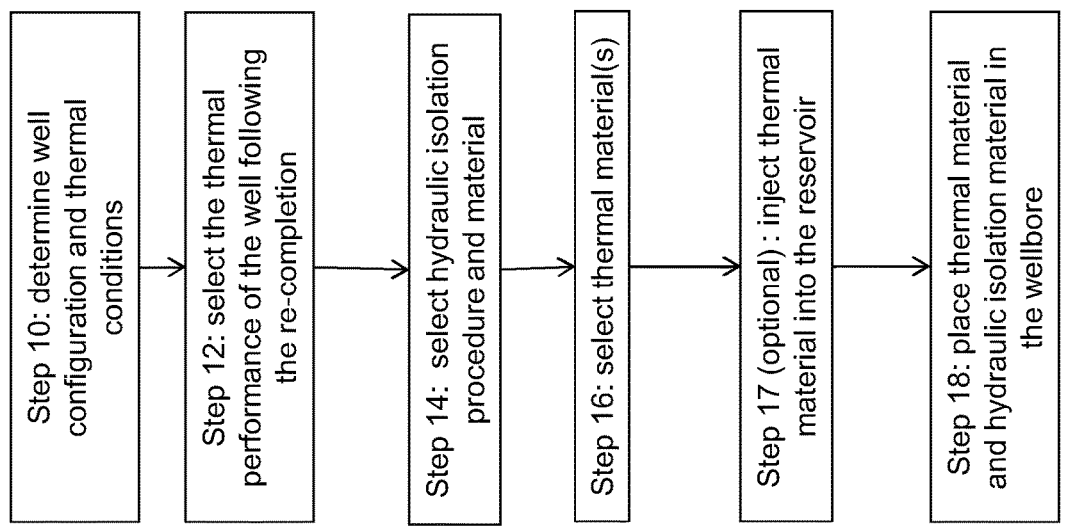
FIG. 11 is a flowchart of steps carried out in one embodiment of the recompletion method.

Referring now to FIG. 11, the recompleting method comprises a series of steps that are performed to recomplete a hydrocarbon well like that illustrated in FIG. 1 to produce geothermal energy. The method comprises determining certain well configuration and thermal conditions, including some or all of: depth, geothermal temperature profile, wellbore configuration, dimensions and trajectory, existing hydrocarbon production interval, existing hydrocarbon production completion type, production stimulation information, reservoir rock types and thermal conductivity, and the fluids within the reservoir (step 10). The method also comprises selecting a desired thermal performance of the recompleted well, and determining certain properties of the well that are required to achieve the selected thermal performance (step 12). The selected behavior(s) include: resistance to thermal flow between the wellbore and the reservoir, thermal conductivity of the reservoir rock surrounding the wellbore and high thermal capacity flow paths from the reservoir to the wellbore.

The recompleting method further comprises selecting a hydraulic isolation procedure (step 14) from a choice of (a) placing a settable material in wellbore casing openings, and (b) inserting a mechanical flow barrier between a wellbore casing and a wellbore interior. Then, a thermal material is selected for use in the hydraulic isolation procedure (step 16), wherein when isolating using a settable material, the settable material is a thermal material, and wherein when isolating using a mechanical flow barrier, the thermal material is a fluid that is placed between the mechanical flow barrier and the wellbore casing. Then, the thermal material and hydraulically isolating means (if different from the thermal material) are placed into the wellbore (110) at a target location within the wellbore (110) to hydraulically isolate and enhance the thermal conductivity of the wellbore (110) (step 18).

As noted above, there are two embodiments of the hydraulic isolation procedure, namely (a) injecting a settable material, and (b) inserting a mechanical flow barrier. The first embodiment is particularly useful for achieving hydraulic isolation within smaller diameter wellbores where other isolation methods may constrain the circulation of the heat transfer fluid. The second embodiment is useful in larger diameter wellbores where simple and effective isolation is desired.

Prior to carrying out the hydraulically isolating procedure, one or more optional steps can be carried out to maintain or improve communication of thermal energy between the reservoir (122) and the hydraulically isolated wellbore (110). These optional step(s) involve injecting a thermal material into the reservoir (122) (step 17). In one embodiment of step 17, thermal material is injected into the reservoir to displace existing fluids in the reservoir, wherein the displaced reservoir fluids have a lower thermal conductivity than the injected thermal material. In another embodiment, thermal material is injected into pores of fracturing sand or proppant within an existing propped fracture network (not shown), such that a high thermal conductivity network is created that is in thermal communication with the wellbore (110). In yet another embodiment, the reservoir (122) is hydraulically fractured then the thermal material is placed in the created fracture openings.

Optionally, the recompletion method can further comprise inserting one or more additives into the wellbore that contribute to the hydraulic isolation procedure, reduce wellbore thermal resistance, enhance reservoir thermal conductivity, and/or create thermal pathways. In one embodiment, the additives include one or more of: viscosifiers, thickening materials, setting chemicals or cements, which are placed within the wellbore (110).

As will be described in more detail below, the thermal material can be a liquid (without or without additives) or a slurry comprising a carrier fluid, a thermal component, and optionally one or more additives. When the thermal material is dispersed in a liquid, the thermal liquid serves to improve thermal conductivity of the reservoir rock by displacing existing fluids from the reservoir matrix void spaces. When the thermal material is a slurry, the thermal component of the slurry can be a thermal solid that has a high thermal conductivity that is at least 15% higher than the reservoir fluid in the reservoir (122). In one embodiment, the thermal solid is comprised of particulates that will aggregate into a porous solid and the carrier fluid is a gas or liquid selected to promote aggregation upon placement by settling, dehydrating, leaking-off or evaporating such that the thermal solid is placed within the wellbore gaps and reservoir voids. In another embodiment, thermal solids are selected that will deform upon closure of a hydraulic fracture where the deformation reduces the thermal material's aggregate porosity to improve the thermal conductivity. Thermal solids are selected that will remain rigid upon closure of a hydraulic fracture where the width of the so created channel and its area is maximized for heat flow form another embodiment. In yet another embodiment, thermal materials are injected into existing reservoir stimulation porosity to displace low conductivity fluids with the purpose of improving the thermal flow within created voids and channels.

When selecting a thermal material to place in a well, consideration should be given to the material's thermal properties including thermal conductivity and thermal flow resulting from use of that material in the well. Consideration should also be given to the thermal conductivity of the thermal material when placed at a target location in the well, whether that be in a dispersed state as formed, in an aggregate porous state with removal of the carrier fluid, or in an aggregate state and deformed by stress to reduce the porosity. Correlations exist that provide thermal conductivities of many gas and liquids with and without solids and in a dispersed state or as an aggregate. For example, thermophysical properties of many gas and liquids can be computed using the U.S Government Department of Commerce, National Institute of Standards and Technology's Reference Fluid Thermodynamic and Transport Properties Database (REFPROP). Slurry and suspended solids mixture conductivities can be calculated using Orr and Dalla Valle's correlation while thermal conductivity of porous solids can be gained from the correlation of Sugawara et al. Results from such correlations should be treated as estimates and can be verified with laboratory testing. Further, for each well, consideration should be given to the relationship between the thermal conductivity of the placed thermal material and the resulting thermal flow. A particular thermal flow response will be a function of the thermal material's thermal conductivity, and the thermal performance of the well can thus be selected by selecting the thermal conductivity of the selected thermal material.

Well thermal circulation performance using a selected thermal material can be modeled or simulated. One such model is a transient simulator comprised of fluid flow correlations coupled to thermal calculations where the rock heat variation with time is determined from Ramey's correlation. Different well configurations can be specified including depth, temperature gradient, multiple casing and liners strings for horizontal and vertical wells. Circulating fluid properties, including the thermal conductivity of the circulating fluid, can be computed using the NIST REFPROP program. The thermal resistance between the wellbore and the reservoir are calculated and include convective heat transfer and up to eight different thermally active materials around the wellbore. Thermal rock properties including thermal conductivity and diffusivity can be specified. For more complex 2-D and 3-D rock based transient thermal flow simulations, transient finite element analysis (FEA) can be performed using commercially available FEA models. One such model is the LISA FEA model with an integrated modeler, multi-threaded solver and graphical post-processor.

Hydraulic Isolation in Wellbore to Enhance Well Thermal Performance

In a first embodiment of the hydraulic isolation procedure, hydraulic isolation is completed using a hydraulic isolation material comprising one or more settable materials injected into the communicating flow paths of the wellbore (110). In a second embodiment of the hydraulic isolation procedure, hydraulic isolation is completed by means of inserting a hydraulic isolation material comprising a mechanical flow barrier in the wellbore.

By way of background, when producing an oil and gas well, a variety of completion methods may be utilized to establish suitable hydraulic communication between the wellbore and the hydrocarbon reservoir to allow production of the contained hydrocarbon fluids. A common method to establish communication involves placement of perforations along the productive interval. As is illustrated in FIG. 2(a), the perforations (215a) penetrate through the casing (214) and cement (213) and into the productive reservoir (222) as a tunnel to provide a flow path into the wellbore. Flow of the contained reservoir fluids (221) from the reservoir (222) into the wellbore (210) is caused by a pressure differential therebetween. Alternatively and as shown in FIG. 2(b), mechanically or hydraulically operated ports (215b) within the casing (214) are placed along the productive zone to provide the desired communication. In these instances, the casing (214) is not cemented into place; rather external packers (219) are used to isolate annular intervals between ports and flow is from the reservoir (222) to the borehole (212) and along the un-cemented gap (211) between the borehole (212) and the casing (214) to the ports (215b). Alternatively, slotted, drilled or screen conduits may be placed across the productive interval (not shown). Like ports, the slotted, drilled or screen conduits are not cemented into place; however, unlike ports, methods to isolate sections for stimulation cannot be completed.

Referring to FIGS. 3(a) and (b), and in accordance with the first embodiment of the hydraulic isolation procedure, settable materials are injected into the communicating flow paths. Examples of suitable settable materials include cement, polymers, resins or other solidifying pumpable fluids. The settable materials are placed into the perforations and ports along a limited, selected length of the producing interval ("target interval") using an isolation method (e.g. a single mechanical resettable tool or cup packer or a straddle, not shown). For example, a resettable packer tool (not shown) can be run into a well conveyed by a coiled tubing string or jointed tubing. The tool is run to the desired productive portion of the well to be treated, such as a 10 m to 50 m interval, and the settable material circulated to the tool. The tool is then caused to set and the material forced into the ports or perforations by pressure applied at surface. The pumping is continued until a pre-specified volume criterion is met or resistance to flow increases such that successful blockage of the flow channels to the reservoir (322) is indicated. Optionally, the tool is then caused to unset, and the interior of the wellbore (110) and tubing cleared of the settable material by workover fluid circulation as needed. When circulated clear and upon determining the material within the ports or perforations has sufficiently set or solidified, the tool may again be set and a pressure test completed across the interval to confirm isolation. FIG. 3(a) illustrates the wellbore casing perforations (315a) filled with the settable material (316) to create the required hydraulic isolation. After a successful pressure test, the packer tool is moved up hole to the next interval and the procedure is repeated until all hydraulically communicating intervals within the wellbore (110) are blocked. The wellbore (110) is then drilled and drifted to ensure any residual settable material does not obstruct the wellbore (110).

In FIG. 3(a), during initial well construction, the wellbore casing (314) is cemented in place inside the borehole (312) by cement (313) that fills the annular space in between the wellbore casing (314) and the borehole (312). In contrast, FIG. 3(b) shows an uncemented wellbore casing (314) having ports (315(b)) instead of perforations, and discontinuous packers (319) instead of cement in the annular space between the wellbore casing (314) and the borehole (312). The technique used to hydraulically isolate the perforations (315(a)) in the cemented wellbore (110) can be applied to this uncemented wellbore, with the additional step of injecting additional settable material (316) into the annular space in between the wellbore casing (314) and the borehole (312). Preferably, the full circumference and length of the port assemblies (315(b)) can be filled with settable material (316) to ensure reliable hydraulic isolation.

Referring to FIGS. 4(a) and (b), and in accordance with the second embodiment of the hydraulic isolation procedure, the mechanical flow barrier is inserted in a wellbore (110) that is cemented in a borehole (412) by cement (413). The mechanical flow barrier can comprise at least one mechanical isolation conduit (417) comprised of casing patches, liners or isolation strings, which are placed across a target producing interval of the reservoir (422), which in this case comprises a segment of a wellbore casing (414) having perforations (415). The mechanical isolation conduit (417) has a smaller diameter than the existing wellbore (110), and is placed inside an existing wellbore casing (414) of the wellbore (110) and set and sealed from reservoir flow at least across the target interval. The mechanical isolation conduit (417) may be composed of metals, ceramics, plastics or combinations thereof, preferentially exhibiting thermal conductivities that will not inhibit thermal flow, and more preferably having a thermal conductivity that is at least 15% greater than that of the reservoir fluid or a thermal material in the wellbore (110). Single or multiple packers or other sealing elements (419) may be placed intermittently within the annular space (411) in between the mechanical isolation conduit (417) and the wellbore casing (414) to further support hydraulic isolation. At least one plug-type packer (418) is located inside the mechanical isolation conduit (417) at a distal end of the wellbore (410); the sealing elements (419) and packer (418) are then set to create a hydraulic barrier between the interior of the mechanical isolation conduit (417) and the existing wellbore (110). Depending upon placement and seal type, the mechanical isolation conduit (417) may be concentric to the existing wellbore casing (414), or eccentric as shown in FIG. 4(b).

Alternatively, an isolation liner (not shown) can be deployed as the mechanical flow barrier; in this case, a single length of inner liner conduit can be placed across the full length of the target interval (422) (not shown). A mechanical anchor (not shown) is placed at the near end to hold the inner liner conduit in place and includes a packer or sealable element for isolation at the hanger. The end of the liner conduit at full depth is in some manner internally plugged to complete the hydraulic isolation. Another alternative mechanical flow barrier is an isolation string (not shown), which is similar to an isolation liner, and may be hung from the wellhead or very near to surface, again with a sealed anchor and an end plug at depth and which serves to hydraulically isolate all or virtually all the wellbore. These configurations are also suitable for ports, slotted, drilled or screen completion pipes.

The hydraulic isolation can result in wellbore diameters being reduced and impede efficient circulation of the heat transfer fluid. For example, an internal diameter can be reduced in the order of 10 to 20% when an isolation conduit is inserted inside the wellbore (110). To address such effects, the largest outer pipe diameter for a casing patch, liner or isolation string can be slightly less than the drift diameter of the wellbore casing (414). Alternatively, expandable tubular components (not shown) can be used to provide the same mechanical isolation with a lower diameter reduction (in the order of 5 to 10%).

Alternatively, all or a portion of the existing casing or liner within a target interval may be removed from the well (100), e.g. via drilling, or reaming for a cemented completion, or reaming and fishing for an un-cemented completion. The mechanical isolation conduit (417) is then placed across the target interval to provide the hydraulic isolation. The new conduit can be a pipe, casing, liner or tubing.

When carrying out either embodiment of the hydraulic isolation procedure, thermal material can be used to mitigate against potentially hindering heat flow resistances introduced by the hydraulic isolation procedure, or even improve the thermal conductivity of the wellbore and/or the reservoir. Unmanaged thermal resistances may significantly reduce the geothermal energy captured by the circulating heat transfer fluid. In each hydraulic isolation procedure embodiment, the type and placement of hydraulic isolation materials can be selected to avoid or at least minimize inhibition of thermal flow through the wellbore (110) caused by the settable materials or mechanical flow barrier. When hydraulically isolating a target interval of the wellbore using a settable material, the settable material can include a thermal material that is selected to maximize the thermal conductivity of the settable material in order to optimize energy gained from the circulation of the thermal transfer fluid. In particular, the selected thermal material should provide the settable material with a thermal conductivity that is at least greater than the reservoir fluid inside the wellbore, and preferably at least 15% greater than the reservoir fluid. For example, it has been found that cement tends to have a better thermal performance than resin as a settable material, and is a possible choice as a settable thermal material. However, the thermal conductivity of a resin can be enhanced with the inclusion of high thermal conductive solids into the resin. In particular, the high thermal conductivity solid should provide the resin with a thermal conductivity that is at least 15% greater than that of the reservoir fluid displaced. Also, it has been found that thermal performance can be improved by reducing the thickness of a residual sheath in the wellbore casing, or eliminating the sheath altogether, when hydraulically isolating using a settable material.

When hydraulically isolating a target interval of the wellbore (110) using the mechanical isolation barrier (417), the thermal performance can be improved by selecting a suitable thermal material for the mechanical isolation barrier (417), and inserting a thermal fluid into the annular space (411) between the mechanical isolation barrier (417) and the wellbore casing (414). Additionally, thermal performance can be improved by minimizing the size of the annular space (411). More particularly, it has been found that minimizing the annular space (411) tends to cause the thermal performance to be relatively insensitive to the choice of thermal fluid. If the annular space (411) cannot be minimized, then it has been found that selecting a thermal fluid with a high thermal conductivity will be useful to maximize heat transfer performance; preferably, the thermal fluid should have a thermal conductivity that is at least 15% higher than that of the reservoir fluid displaced from the annular space (411) by the thermal fluid.

The following provides a detailed explanation of tests that were performed to support the above findings:

In overview terms, the rate of heat flow to a circulating heat transfer fluid during a geothermal energy recovery operation is a function of temperature differential between the heat transfer fluid and the adjacent reservoir rock, distance of the heat flow path and the thermal resistance of the materials across the heat flow path. The materials are typically the reservoir rock, reservoir fluids, cement (if present) and the wellbore casing. The final thermal resistance to heat flow is the convective heat transfer coefficient established by the circulating heat transfer fluid at the flow boundary of the containing conduit. Further, with time the near well reservoir rock cools with removed heat to approach a reduced steady state heat flow.

Table 1 below presents the typical and applicable range of thermal conductivities for materials and fluids common to oil and gas wells. Of a reservoir rock heat source, typical thermal conductivities are seen in the order of 1.5 W/m-K to 3.2 W/m-K. Notably these conductivity values are much larger than those for cement, polymers, resins, epoxy and the common reservoir fluids of water, oil and natural gas. Also of note is the thermal conductivity of steel, significantly greater than all other materials at 43 W/m-K. Laboratory testing for thermal conductivity and other relevant behaviors of all materials can be performed by one skilled in the art. In particular, the thermal conductivity of the reservoir fluid in the wellbore and/or adjacent reservoir can be conventionally measured or determined.

TABLE 1

Typical Thermal Conductivity of Well Related Materials

| Material | Thermal Conductivity (W/m-K) |
| --- | --- |
| Steel (1% carbon) | 43 |
| Oilwell Cement | 1.1 (0.26-1.3) |
| Sandstone | 3.2 (1.5-5.1) |
| Limestone | 2.8 (1.3-3.5) |
| Shale | 2.2 (1.1-2.6) |
| Water | 0.58 |
| Oil | 0.15 |
| Natural Gas (25 C., 1 atm) | 0.035 |
| Generic resin | 0.15-0.32 |

Settable materials such as cements, polymers and resins exhibit much lower thermal conductivities than that of the reservoir rock, which would normally result in increased thermal resistance across the heat flow path. Further, when the existing completion is not cemented, the resulting annular space between the wellbore casing and the borehole may contain some comparatively low conductivity reservoir fluid (e.g. hydrocarbons, oil or natural gas). Similarly, placement of a mechanical isolation barrier such as the mechanical isolation conduit as shown in FIG. 4, will create an annular gap (411) between the placed barrier and the existing wellbore, and can result in increased thermal resistance if occupied by low thermal conductivity reservoir fluid.

Figure 5:
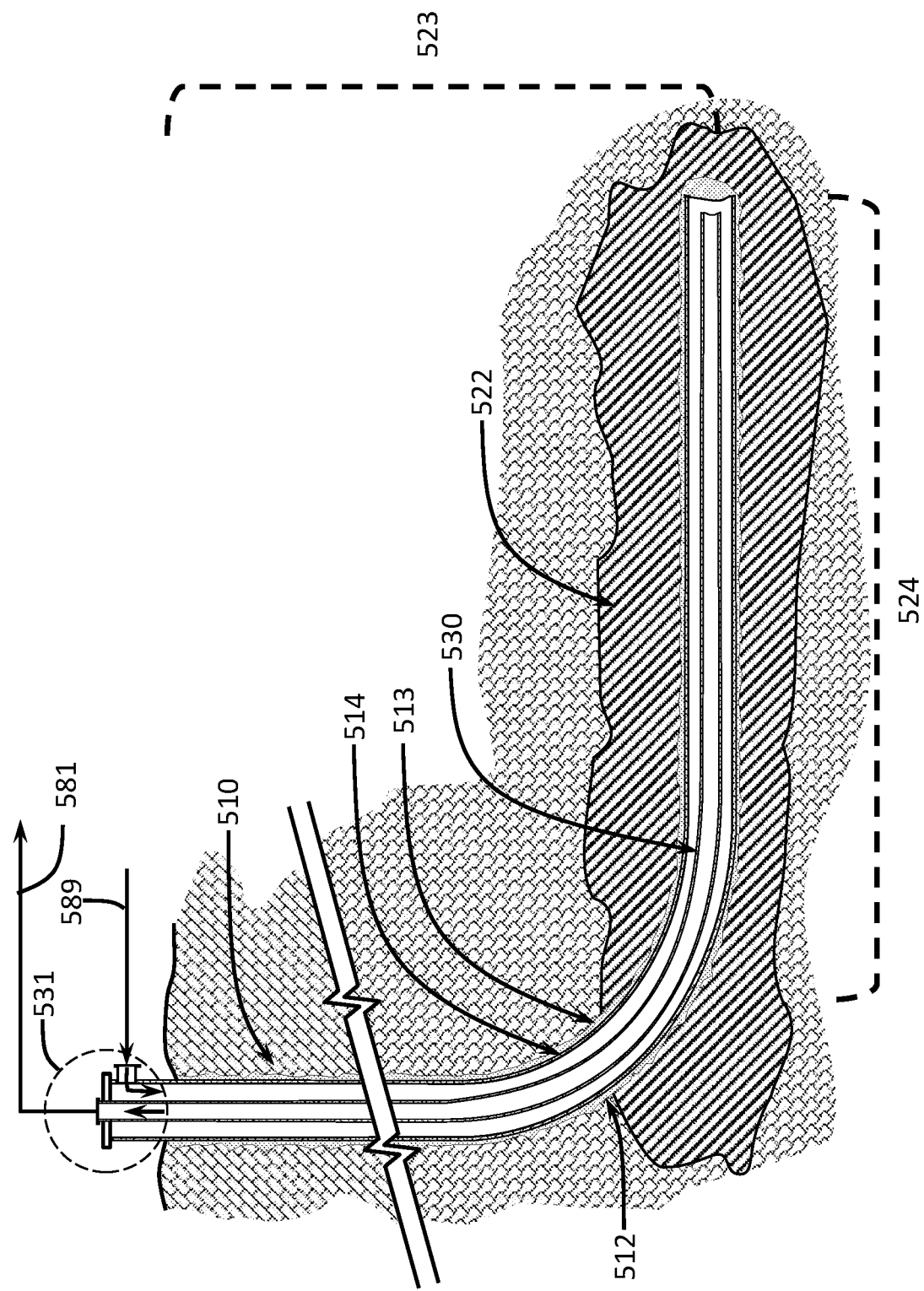
FIG. 5 is a schematic side sectional view of an exemplary hydrocarbon well that has been recompleted to produce geothermal energy by an embodiment of the recompletion method.

FIG. 5 shows a recompleted wellbore model (510) and that has been subjected to a number of simulated geothermal energy production using a circulating heat transfer fluid that extracts heat from an adjacent thermal reservoir (522). Table 2 below presents the parameters of the simulations. The modeled wellbore configuration is presumed changed along the full length of the horizontal to illustrate the impact on thermal flow with the various means and materials applied to gain hydraulic isolation. The modeled wellbore has a 177.8 mm mono-bore casing (514) cemented (513) in a 200.3 mm borehole (512) with a vertical depth (523) of 3,000 m with a single horizontal leg (524) at a length of 2,500 m. Typical to horizontal wells, the productive interval requiring hydraulic isolation is found only along the length of the horizontal. During geothermal energy production, the heat transfer fluid is injected (589) into the wellbore along the annular space with that heat transfer fluid returned (581) through the interior of the tubing (530) to the wellhead (531). The heat transfer fluid is circulated at a rate of 300 L/min at an injection temperature of 20 C. The circulated heat transfer fluid is water.

TABLE 2

Model Well Parameters

FLUID INJECTION

| Circulation Fluid | Water | |
|---|---|---|
| Injection Temperature | 20 | C. |
| Injection Rate | 300 | L/min |

FORMATION THERMAL PROPERTIES

| Temp Gradient | 0.035 | C./m |
|---|---|---|
| Surface Ground Temp | 15 | C. |
| Thermal Diffusivity | 1.03E−06 | m2/s |
| Thermal k | 2.7 | W/m-K |
| BHT= | 120 | C. |

WELLBORE SUMMARY

| Wellbore Segment | Hole Size (mm) | Casing Size (mm) | Casing Inner Diameter (mm) | Wellbore U (W/m2-K) |
|---|---|---|---|---|
| Vertical to 3000 m MD | 200.3 | 177.8 | 161.7 | 108.1 |
| Horizontal to 5500 m MD | 200.3 | 177.8 | 161.7 | Various |

The following geothermal energy production simulations were performed on the modeled wellbore:

1—BASE CASE—BOREHOLE ONLY: This simulation configuration models a horizontal wellbore that is not cemented or cased and provides a theoretical best case thermal performance baseline for the wellbore. In place of the cement and casing, rock is modeled in this space at the 2.7 W/m-K conductivity to maintain a consistent wellbore inner diameter.

2—PRIOR TO ISOLATION; CEMENT & CASING: This simulation configuration presents the most common initial configuration expected from a producing well; the well is cased, cemented and perforated. Hydraulic isolation is presumed not completed on the well and represents the well's starting thermal performance capability.

3—CEMENT ISOLATION TO DRIFT DIAMETER; k=1.125: The configuration in this simulation presumes a cemented and cased well with perforations that has been hydraulically isolated using a settable material, a generic oilwell cement with a cured thermal conductivity of 1.125 W/m-K. The isolation is achieved by pumping the cement into the perforations along the entire length of the horizontal. As is common, following the placement and curing of the cement the wellbore is presumed cleaned via a drill run to leave a cement sheath equal to that of the pipe drift diameter at 158.5 mm.

4—RESIN ISOLATION TO DRIFT DIAMETER; k=0.15: This simulation configuration presumes a cemented and cased well with perforations hydraulically isolated using a settable material, a generic resin with a cured thermal conductivity of 0.15 W/m-K. Again, the wellbore is presumed cleaned via a drill run leave a resin sheath equal to that of the pipe drift diameter at 158.5 mm.

5—ISOLATION W/139.7; NAT'L GAS; k=0.059: This simulation configuration presumes a cemented and cased well with perforations that has been hydraulically isolated by mechanical means; placement of a 139.7 mm sealed conduit or liner along the full extent of the horizontal. This pipe size is chosen as the largest casing size common to the industry that can be run into the 177.8 mm casing. The resulting diameter difference, casing to inserted liner is 22 mm to create an annular void at 11 mm if concentric. In this simulation the void space is presumed filled with natural gas exhibiting a thermal conductivity of 0.059 W/m-K at the condition of 90 C and 15 MPa.

6—ISOLATION W/139.7; OIL; k=0.15: This simulation configuration is identical to that of configuration #5 above with the exception the void space is filled with oil at a thermal conductivity of 0.15 W/m-K rather than natural gas.

7—ISOLATION W/139.7; WATER; k=0.68: This simulation configuration is identical to that of configuration #5 above with the exception the void space is filled with water at a thermal conductivity of 0.68 W/m-K rather than natural gas.

8—ISOLATION W/EXPANDABLE; NAT'L GAS; k=0.059: This simulation configuration is identical to that of configuration #5 above with the exception that rather than a 139.7 mm isolation pipe, an expandable pipe is applied along the full length of the horizontal. Following expansion and setting of the pipe, the outer diameter of the expandable pipe is presumed at 158.7 mm to result a concentric void space between the casing and this liner at 1.5 mm. The void space is presumed filled with natural gas exhibiting a thermal conductivity of 0.059 W/m-K at the condition of 90 C and 15 MPa.

9—PRIOR TO ISOLATION—NAT'L GAS & CASING; k=0.059: This simulation configuration presents the other most common initial configuration expected from a producing well; the well is cased, not cemented and produces from ports, slots or screen type of casing. Hydraulic isolation is presumed not completed on the well and represents a theoretical unaltered state performance expectation. In this instance the casing to wellbore void space is presumed filled with natural gas exhibiting a thermal conductivity of 0.059 W/m-K at the condition of 90 C and 15 MPa.

10—PRIOR TO ISOLATION—WATER & CASING k=0.68: This simulation configuration is identical to that of configuration #9 above with the exception the void space is filled with water at a thermal conductivity of 0.68 W/m-K rather than natural gas.

Table 3 presents the results of the above simulations. Each simulation featured a different wellbore configuration that each produced a determined heat transfer coefficient (U) between the reservoir rock and the circulating heat transfer fluid where all other well and circulating parameters remain constant. The resulting heat transfer coefficient for each configuration is provided under the column heading "Wellbore U (W/m$^2$-K)" based upon the inner diameter of the circulating fluid flow path and includes conductive and convective heat transfer. The maximum temperature of the circulating heat transfer fluid is achieved at the full depth of the well, the bottom hole circulating temperature, is found under the heading "BHCT (C)" and represents the temperature after 300 days continuous circulation. The energy gained by the circulating heat transfer fluid at 300 days is reported under the heading of "Energy Gain (kW)". Notably, with continuous circulation for 300 days energy has been removed from the reservoir rock where the amount of energy removed is dependent upon the heat transfer coefficient. High thermal resistances (lower heat transfer coefficients) are expected to reduce that recovered energy and maintain higher near wellbore rock temperatures. To normalize this effect the cumulative energy gained from the well over the 300 day continuous circulation period is reported under the heading "Cum Energy (MJ)".

tions #3 through #8 illustrate the comparative resulting thermal performance to configuration #2 with the various hydraulic isolation means. Columns 3 and 4 show relative thermal performance of the wellbore hydraulically isolated by settable materials, while columns 5 to 8 show thermal performance of the wellbore hydraulically isolated by a mechanical flow barrier. Configurations #9 and #10 present the comparative thermal performance with an un-cemented casing and prior to implementing hydraulic isolation.

Figure 6:
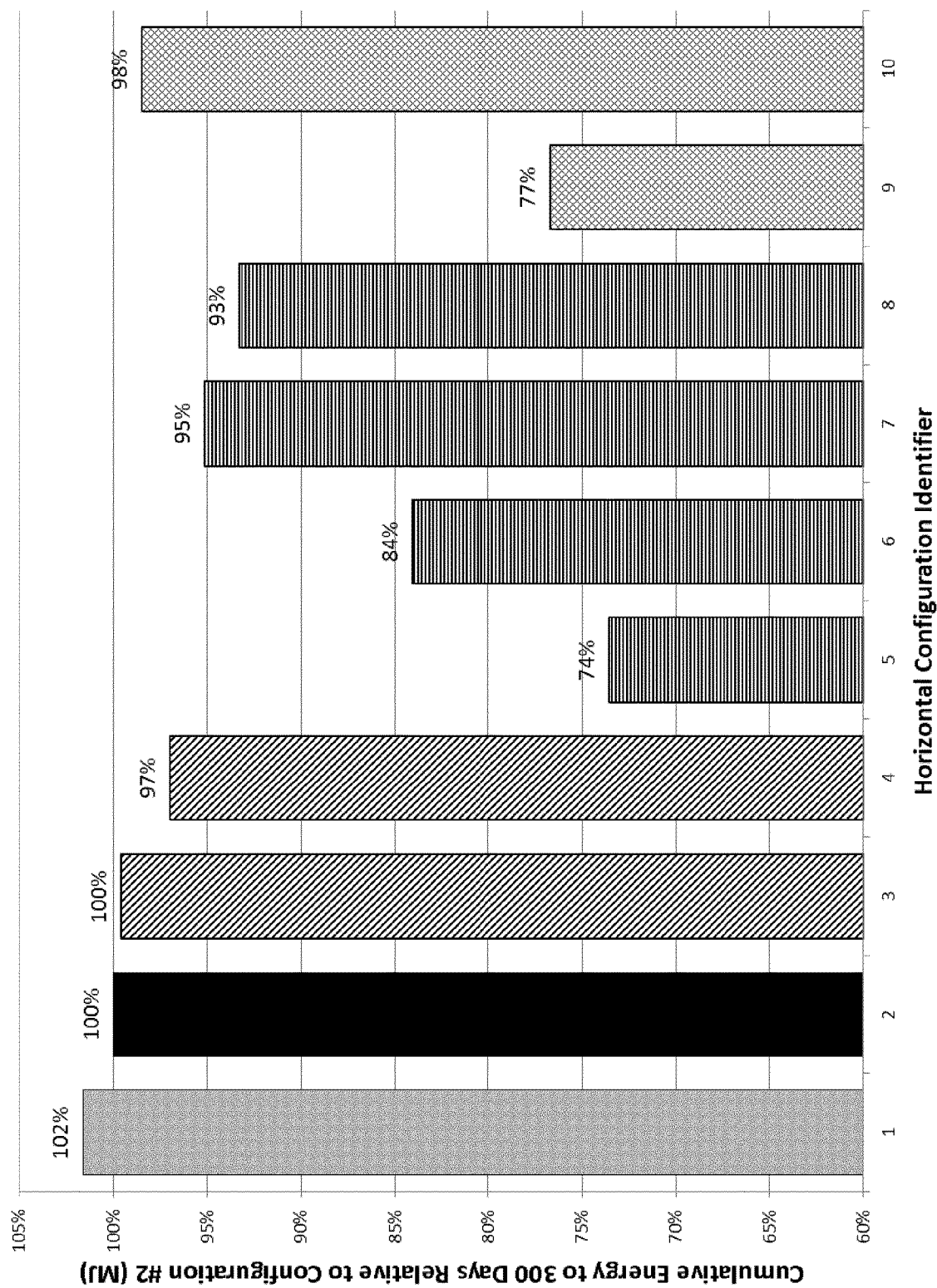
FIG. 6 is a chart illustrating the relative cumulative energy gathered from a 300 day circulation simulation applied to the well shown in FIG. 5.

As can be seen in FIG. 6, there is a wide variation of relative thermal performances between the different configurations. Of note is that the typical cemented and perforated completion of configuration #2 illustrates a minimal 2% relative variation from that of a theoretical borehole that exists without cement or casing (i.e. configuration 1). Further, the cement sheath in configuration #3 has virtually no impact on the thermal performance compared to configuration 2 while the lower conductivity resin results in a 3% reduction. For hydraulic isolation using a 139.7 mm pipe, the choice of material within the annular gap or void is shown to have a large impact on the relative thermal performance. Low conductivity natural gas used in configuration #5 shows a large 26% reduction while higher conductivity oil used in configuration #6 and water used in configuration #7 show reductions of 16% and 5% respectively. The same mechanical isolation method shown in configuration #8 using an expandable pipe and a very small annular gap or void shows a 7% reduction in spite of an

TABLE 3

Impact of Wellbore Configuration on Resistivity and Geothermal Fluid Heating

| # | Wellbore Configuration | Wellbore U (W/m$^2$-K) | 300 day BHCT (C.) | 300 day Energy Gain* (kW) | 300 day Cum Energy (MJ) |
|---|---|---|---|---|---|
| 1 | BASE CASE - BOREHOLE ONLY | 218 | 70.9 | 1053 | 2,492,000 |
| 2 | PRIOR TO ISOLATION; CEMENT & CASING | 108 | 72.8 | 1037 | 2,452,000 |
| 3 | CEMENT ISOLATION TO DRIFT DIAMETER; k = 1.125 | 95.7 | 69.9 | 1036 | 2,442,000 |
| 4 | RESIN ISOLATION TO DRIFT DIAMETER; k = 0.15 | 51.2 | 68.7 | 1008 | 2,378,000 |
| 5 | ISOLATION W/139.7; NAT'L GAS; k = 0.059 | 6.1 | 58.9 | 767 | 1,804,000 |
| 6 | ISOLATION W/139.7; OIL; k = 0.15 | 14.6 | 64.5 | 879 | 2,062,000 |
| 7 | ISOLATION W/139.7; WATER; k = 0.68 | 48.4 | 70.2 | 990 | 2,334,000 |
| 8 | ISOLATION W/EXPANDABLE; NAT'L GAS; k = 0.059 | 30.3 | 69.2 | 972 | 2,288,000 |
| 9 | PRIOR TO ISOLATION - NAT'L GAS & CASING; k = 0.059 | 6.1 | 60.6 | 801 | 1,881,000 |
| 10 | PRIOR TO ISOLATION - WATER & CASING; k = 0.68 | 67.7 | 71.8 | 1023 | 2,415,000 |

The relative cumulative energy gathered from the 300 day circulation from Table 3 is plotted in FIG. 6, wherein each configuration is represented by a different column. Configuration #2 represents a base case and is shown as column 2 with a 300 day energy gain in the circulating fluid of 2,452,000 MJ. Configuration #2 represents that of a cemented and perforated well and is simulated prior to implementing hydraulic isolation representing common conditions for a well that is to be redeployed for geothermal purposes. Configuration #1 is represented as column 1 which shows the relative theoretical performance prior to completing for oil and gas production where only the borehole is present at a diameter of 177.8 mm. Configuraannular void filled with natural gas. Configurations #9 and #10 highlight the impact of the casing to borehole annular material in an un-cemented type of completion where natural gas used in configuration #9 shows a 23% reduction to that of configuration #2 with cement, and configuration #10 with water at only 2%.

These simulations show the thermal impact of the different method and materials used in the hydraulic isolation procedure and can provide guidance on selecting a suitable thermal material for enhancing thermal performance. For settable materials, the choice of thermal material to maximize the thermal conductivity of the settable material can help optimize energy gained from the circulation. Cement at a conductivity of 1.125 W/m-K is seen to provide some improved thermal performance over that of a resin (conductivity of 0.15 W/m-K) an improvement of about 640,000 MJ. As seen in Table 3, the heat transfer coefficient difference resulting from a near order of magnitude thermal conductivity difference decreases by a half at 95.7 W/m$^2$-K and 51.2 W/m$^2$-K for cement and resin respectively. However, the thickness of the residual sheath within the casing is presumed at only 1.6 mm. With a thicker sheath, the thermal resistance will be amplified for that relative to a wellbore without a sheath (e.g. configuration #2), and to wellbores having a low conductivity settable material (configuration #4) and having a high conductivity settable material (configuration #3). For comparison, the heat transfer coefficients determined for no sheath, a 1.5 mm cement sheath and a 5 mm cement sheath are 108, 95.7 and 77.9 W/m$^2$-K respectively. In a hydraulic isolation procedure that applies a settable material, thermal performance will be maximized by those materials exhibiting high thermal conductivity. Additionally, minimization or elimination of the sheath will also serve to maximize thermal performance by full diameter bore drilling and/or reaming to minimize or completely remove the sheath, or other method to eliminate sheath.

Where hydraulic isolation is achieved by a mechanical isolation barrier, the type of fluid within the annular space ("annular fluid") between the mechanical isolation barrier and the wellbore casing, and the dimension of the annular space are factors affecting the thermal performance. At larger annular gaps, the conductivity of the annular fluid appears to greatly impact the thermal performance. The presence of low conductivity reservoir fluids such as natural gas (e.g. configuration no. #5) and oil (e.g. configuration #6) result in poor thermal performance with reductions of 26% and 16% respectively. Water, with a much higher conductivity shows only a 5% reduction. By minimizing the annular gap, the thermal performance becomes comparatively insensitive to the annular fluid within the annular gap; an 11 mm gap with natural gas (e.g. configuration #5) shows the reduction of 26% while a 1.5 mm gap again with natural gas (e.g. configuration #8) shows only a 7% reduction. When hydraulic isolating the wellbore using a mechanical isolation barrier, the thermal performance will be improved by reducing the annular gap dimension and by ensuring a suitable thermal fluid is placed within the annular space instead of reservoir fluid. Those annular spaces that are in fluid communication with the reservoir, though initially filled with a higher conductivity thermal material, may during geothermal energy production be invaded by hydrocarbon gases or liquids to form a high thermal resistance barrier. This hydrocarbon invasion can be mitigated or even avoided by placing a thermal fluid in the annular space that has a high viscosity or is settable. Depending on the selected thermal material, at least the horizontal section of the well can be filled with the selected thermal material and the conduit run and set into that thermal fluid. This technique may result in full length, full circumference coverage. Alternatively, following placement of the hydraulic isolation conduit and before setting the sealing elements or packers, a circulation string can be run into the well and set into the hydraulic isolation conduit; the well is then circulated with the desired thermal fluid down the circulation tubing into the annular space.

Injecting Thermal Material into Wellbore to Enhance Well Thermal Performance

In another embodiment, the thermal performance of a well (100) may be enhanced by injecting one or more thermal materials into the reservoir surrounding the wellbore (110). In one embodiment, thermal performance of the well (100) is enhanced by placing a thermal material into the pores, fissures and/or fractures of the rock surrounding the wellbore including existing hydraulic fracture or stimulation porosity. In another embodiment, the reservoir rock is hydraulically fractured, then thermal materials are placed into the fractured rock. In all cases, placement of the thermal material in the reservoir is completed prior to, or as a part of the hydraulically isolation procedure carried out in the wellbore (110).

In one embodiment, thermal materials to improve thermal conductivity (and thereby maximize heat transfer) include one or more selected solids ("thermal solids") mixed with a carrier fluid to form a thermal mixture. In general, the selected thermal solids will exhibit thermal conductivities of at least an order of magnitude greater than those of carrier liquids or slurries that are used to place the thermal solids. Table 4 presents the thermal conductivity of a number of potential thermal solids. Laboratory testing or other confirmation for thermal conductivity and other relevant behaviors of all materials can be obtained from testing by one skilled in the art.

TABLE 4

Conductivity of Some Solids

| Material Solid | Thermal Conductivity (W/m-K) |
| --- | --- |
| Silver | 427 |
| Copper | 395 |
| Aluminum | 237 |
| Carbon nanotubes | 3,200-3,500 |
| Brass | 120 |
| Nickel | 91 |
| Alumina (Al$_2$O$_3$) | 39 |
| Silicon | 148 |
| Graphite | 25-470 |
| Beryllium Oxide | 260 |
| Silicon Carbide | 270 |
| Aluminum Nitride | 320 |

The thermal mixture can be in the form of a slurry, which is pumpable to place the selected thermal solids in a target location. The carrier fluid can be a liquid or a gas and the carrier fluid can remain in place with the thermal solids or be at least partially removed after the thermal solids have been placed. Further, the carrier fluid can be water-based, hydrocarbon-based or be another suitable liquid that can be viscosified and cross-linked using a soluble polymer, or contain other chemicals or materials to assist in its placement. Alternatively or additionally, the thermal mixture comprising a settable liquid or slurry such as a resin, epoxy, polymer or cement can be used to place and retain the thermal solids.

The thermal conductivity of a slurry-based thermal mixture will be dependent upon a number of factors, such as the type of carrier liquid and the type of thermal solid, and their respective physical properties, such as: size of the solid particles, shape of the particles, quantity, thermal interface resistance, anisotropic alignment, and particle dispersion. The slurry can contain other additives, which may influence the thermal performance of the mixture depending upon their concentration and physical properties. Determining thermal conductivity of the thermal mixture can be complex and can be determined by one skilled in the art carrying out laboratory testing. For screening purposes, the conductivity of the thermal mixture can found in available literature or may be approximated based upon the physical properties of the components. Simple correlations presume even dispersion of particles and determine conductivity based solely upon the conductivities of the carrier liquid and the solid particles and the volumetric concentration of the solids. In one embodiment, the slurry is applied as a pumpable fluid at a moderate volume concentration where, once placed in contact with permeable rock, the carrier fluid disperses or is caused to disperse into the permeability to leave predominately a very high concentration of thermal solid. Alternatively, the carrier fluid might be selected such that it will evaporate following placement of the thermal solid. In either case, the remaining material would become a porous solid with a carrier fluid filled porosity. That porosity can be caused to be filled with a material exhibiting a desired conductivity or settable properties should the resulting porosity exhibit sufficient permeability.

For example, a form of graphite can be chosen as the thermal solid. Graphite is a suitable material as it exhibits a relatively high thermal conductivity in the range of 25-470 W/m-K. Further, graphite is relatively low cost, non-toxic, and commercially available over a wide range of particle sizes, is chemically inert with most liquids, at least resistant to thermal and chemical degradation and exhibits a comparatively low density at ~2,300 kg/m$^3$. In this example, the selected graphite is a natural flake and exhibits a thermal conductivity of 300 W/m-K. Presuming a suitable pumpable water based slurry is created at a concentration of 30%, 30 vol. % graphite and 70 vol. % water; the calculated thermal conductivity is 1.6 W/m-K. The same graphite slurry upon dehydration by leak-off becomes a porous solid with water filled porosity at ~35% dependent upon roundness and packing configuration of the particles. The expected thermal conductivity as a porous solid with an approximate 35% porosity is in the order of 60% of that of the solid material itself. For the 300 W/m-K graphite, the resulting thermal conductivity is determined at 180 W/m-K. The 30 vol. % graphite slurry itself with conductivity at 1.6 W/m-K provides a significant improvement over that of water at 0.68 W/m-K. Higher concentrations of graphite in the slurry can further improve the conductivity; 40 vol. % yields a conductivity of 2 W/m-K and 60 vol. % yields 4.4 W/m-K. The concentration limit will be that of maintaining a pumpable slurry as needed to place the material at the desired place within the wellbore. With these mixtures the slurry can be made less thermally resistive, thermally neutral or moderately thermally enhanced relative to reservoir conductivity typically in the order of 1.5 to 3 W/m-K. When the slurry is packed and exhibit porous solid behaviors, exceptionally high thermal conductivity can result.

Further, graphite can also be used within a cement slurry when a higher conductivity settable thermal material is desired. For example, natural flake graphite combined with bentonite cement at 10 vol. % bentonite cement, 4 vol. % graphite flake and 86 vol. % water results in a set cement thermal conductivity of 2.7 W/m-K.

Simulations were carried out to determine the effect of placing thermal material into a reservoir on the thermal performance of the well. The simulations comprised configurations prior to isolation that was similar to configurations #9 and #10, namely an un-cemented horizontal casing. The simulations then carried out the following new configurations:

11—50% GRAPHITE SLURRY ISOLATION TO FILL ANNULUS; k=2.7: This simulation configuration presents hydraulically isolating a well that is cased (not cemented) and produces from ports within the casing. In this instance, the casing to wellbore void space (annulus) is presumed filled with water containing a settable soluble polymer with 50 vol % graphite exhibiting a thermal conductivity of 2.7 W/m-K.

12—ISOLATION WITH POROUS GRAPHITE TO FILL ANNULUS; k=180: This simulation configuration is identical to that of configuration #11 with the exception that the void space is filled with dehydrated graphite at a thermal conductivity of 180 W/m-K and then sealed into the wellbore with a settable soluble polymer containing 50 vol. % graphite exhibiting a thermal conductivity of 2.7 W/m-K.

The results of the simulations for the new configurations, #11 & #12, are presented in Table 5 along with the results from configurations #1, #9 & #10 for comparison.

TABLE 5

Improvement of Wellbore Configuration for Geothermal Fluid Heating

| # | Wellbore Configuration | Wellbore U (W/m$^2$-K) | 300 dav BHCT (C.) | 300 day Energy Gain (kW) | 300 day Cum Energy (MJ) |
|---|---|---|---|---|---|
| 1 | BASE CASE - BOREHOLE ONLY | 218 | 70.9 | 1053 | 2,492,000 |
| 9 | PRIOR TO ISOLATION - NAT'L GAS & CASING; k = 0.059 | 6.1 | 60.6 | 801 | 1,881,000 |
| 10 | PRIOR TO ISOLATION - WATER & CASING; k = 0.68 | 67.7 | 71.8 | 1023 | 2,415,000 |
| 11 | 50% GRAPHITE SLURRY ISOLATION FILL ANNULUS; k = 2.7 | 211 | 73.1 | 1051 | 2,487,000 |
| 12 | ISOLATION W/POROUS GRAPHITE TO FILL ANNULUS; k = 180 | 777 | 73.7 | 1061 | 2,514,000 |

It is apparent from Table 5 that configurations #11 and #12 result in a cumulative energy gain that is virtually identical to that of a borehole without an impeding conductivity #1 (configuration #11 at 99.8% and configuration #12 at 100.9%). However, the gain over the natural gas case of configuration #9 is significant, with an improvement from 76%. The gain over that from the water configuration at a k=0.68 W/m-K in configuration #10 from 97% is moderate. Notably, the simulations illustrate that the heat flow with wellbore thermal coefficients above about 50 W/m$^2$-K are constrained by the reservoir conductivity rather than heat flow resistances. Of note is the significant impairment of energy flow caused by low conductivity fluids yielding heat transfer coefficients less than about 10 W/m$^2$-K.

Injecting Thermal Material into Reservoir to Enhance Well Thermal Performance In other embodiments, thermal performance of the well is improved by improving the thermal performance of the surrounding reservoir rock. This is accomplished by increasing the thermal conductivity within the rock matrix or existing stimulation porosity along the wellbore. Within many depleted hydrocarbon formations, the porosity, fissures and fractures within the reservoir continue to contain relatively low thermal conductivity hydrocarbon reservoir fluids, such as natural gas, condensates and crude oils. In one embodiment, a higher thermal conductivity thermal material is injected into the reservoir void spaces to displace the lower thermal conductivity reservoir fluids form the void spaces, which is expected to significantly improve the thermal conductivity and heat transfer to the wellbore. For example, a non-porous sandstone formation typically has a thermal conductivity of approximately 3.2 W/m-K. In comparison, a sandstone formation with 10% porosity wherein the pores are filled with reservoir fluids composed of gas, oil or water typically has thermal conductivities of 2.0, 2.3 and 2.6 W/m-K respectively (these thermal conductivities are based on an assumption of a continuous reservoir without heterogeneities, fissures or fractures). These porous features, particularly when near the wellbore, may be particularly resistive to heat flow when filled with a low thermal conductivity reservoir fluid such as natural gas.

Table 6 presents an example illustrating the impact of a reservoir rock's thermal conductivity on a circulating heat transfer fluid's cumulative energy gain. The example is based on previous configuration #12 (ISOLATION WITH POROUS GRAPHITE TO FILL ANNULUS; k=180). Configuration #12 was selected as there is virtually no heat flow restriction into either the completion or the hydraulic isolation steps such that the impact of reservoir thermal conductivity will not be masked.

TABLE 6

Impact of Rock Thermal Conductivity on Geothermal Fluid Heating

| Sandstone Rock | Thermal Conductivity (W/m-K) | 300 day Cumulative Energy (kW) | 300 day Cumulative Energy Relative Change (—) |
|---|---|---|---|
| 10% Porosity, Gas Filled | 2.0 | 2,075,000 | 0.84 |
| 10% Porosity, Oil Filled | 2.3 | 2,276,000 | 0.93 |
| 10% Porosity, Water Filled | 2.6 | 2,459,000 | 1.00 |
| 8% Porosity, Water Filled | 2.7 | 2,514,000 | 1.02 |
| Zero Porosity | 3.2 | 2,771,000 | 1.13 |

Table 6 indicates that the thermal conductivity of reservoir rock filled with reservoir fluid plays a significant role in the heat added to a circulating heat transfer fluid. Notably, rock having a 10% porosity and filled with gas has an energy gain that is about 16% less than that for the same rock that is filled with water. The same rock that is filled with oil has an energy gain that is about 7% less than water-filled rock. In comparison, sandstone rock with zero porosity and having a thermal conductivity of 3.2 W/m-K provides an energy gain of ~13% higher than 10% porosity rock filled with water.

In recompleting oil and gas wells to geothermal energy purposes, the reservoirs are most likely to be filled with gas or oil. On the other hand, dry non-productive wells are more likely to be of low porosity or water-filled and hence provide better thermal conductivity. The most unfavorable candidates for recompletion will be depleted high porosity gas wells—thermal conductivities as low as 0.7 W/m-K are expected in a depleted gas well having reservoir rock with 30% porosity.

Figure 7:
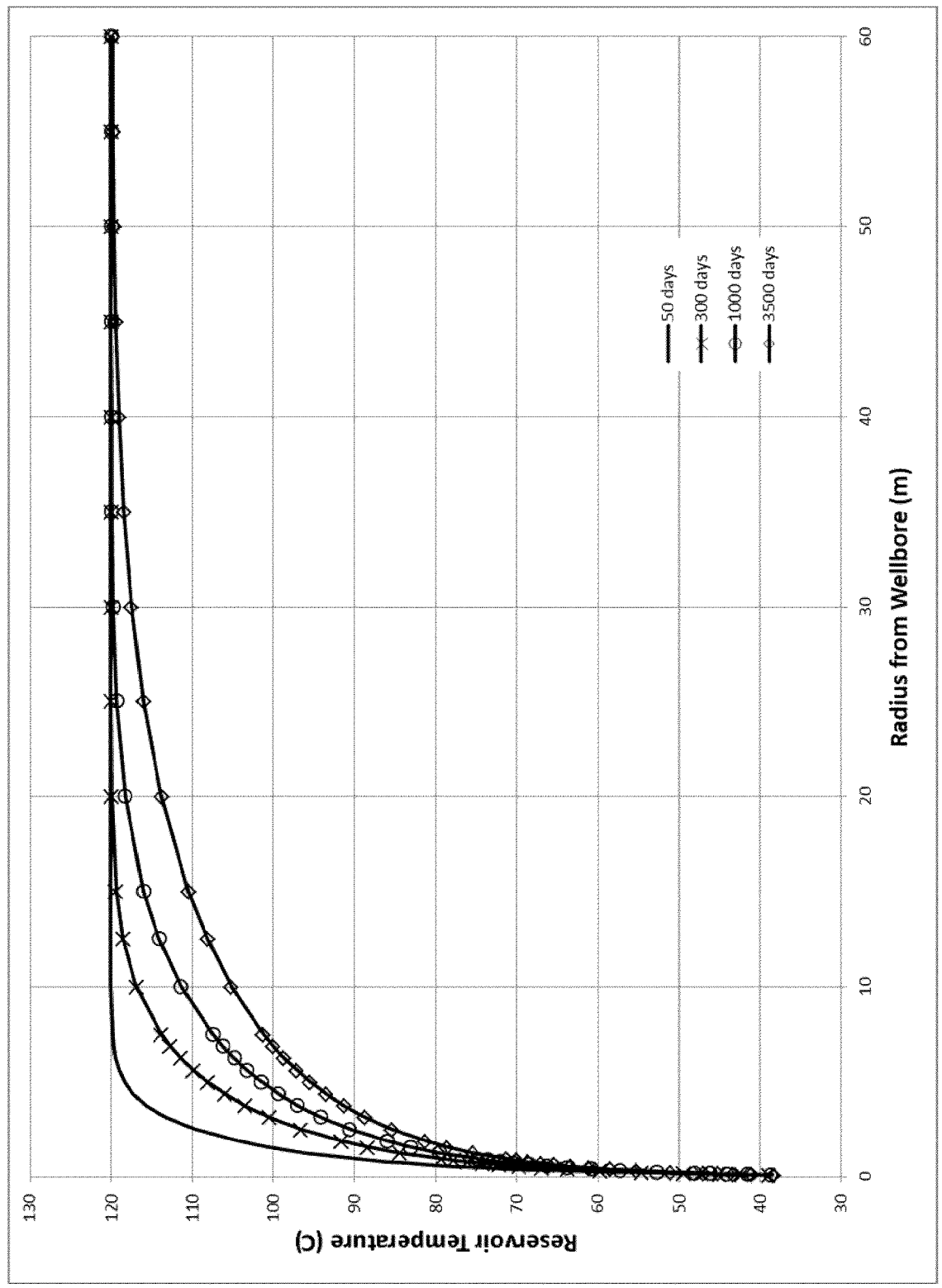
FIG. 7 is a graph illustrating the expected temperature profile into the reservoir of a horizontal wellbore of the well shown in FIG. 5, wherein the wellbore is in a natural gas filled and sandstone reservoir having a temperature of 120° C. and a porosity of 8%.

To counter the effects of porous reservoir rock filled with reservoir fluid having a low thermal conductivity, the recompletion method can further comprise injecting additional thermal material into the reservoir rock thereby displacing the existing fluid in the rock, wherein the additional thermal material has a higher thermal conductivity than the displaced fluid, and preferably has at least 15% higher thermal conductivity. Simulations using finite element analysis were carried out to examine the effects of this procedure over a period of time, and the results are shown in FIG. 7. This Figure illustrates the expected temperature profile as a function of radial distance from a horizontal wellbore, and is in a sandstone reservoir that is at 120° C., having an 8% porosity and which is filled with natural gas. The gross thermal conductivity of the rock is 2.0 W/m-K and the circulating heat transfer fluid is water presumed flowing at a temperature of 36° C. with a wellbore-to-reservoir heat transfer coefficient of 130 W/m$^2$-K. The temperature profiles at 50, 300, 1,000 and 3,500 days are shown. Notably, the rock temperature at the wellbore (~0.1 m) is very similar that of the circulating fluid at 38° C. to 40° C. With time, the temperature was observed to decrease deeper into the reservoir rock as heat was removed, until an asymptote at the reservoir temperature was approached. FIG. 7 illustrates only a moderate temperature reduction from 120° C., where after 3,500 days the initial reservoir temperature was found at ~50 m from the wellbore. At 10, 300 and 1000 days, the initial reservoir temperature was found at 6 m, 18 m, 30 m respectively. These results suggest that replacing the existing reservoir fluids with a thermal material having a higher thermal conductivity than the reservoir fluids would be effective at a moderate distance into the reservoir to improve thermal performance of the well.

Figure 8:
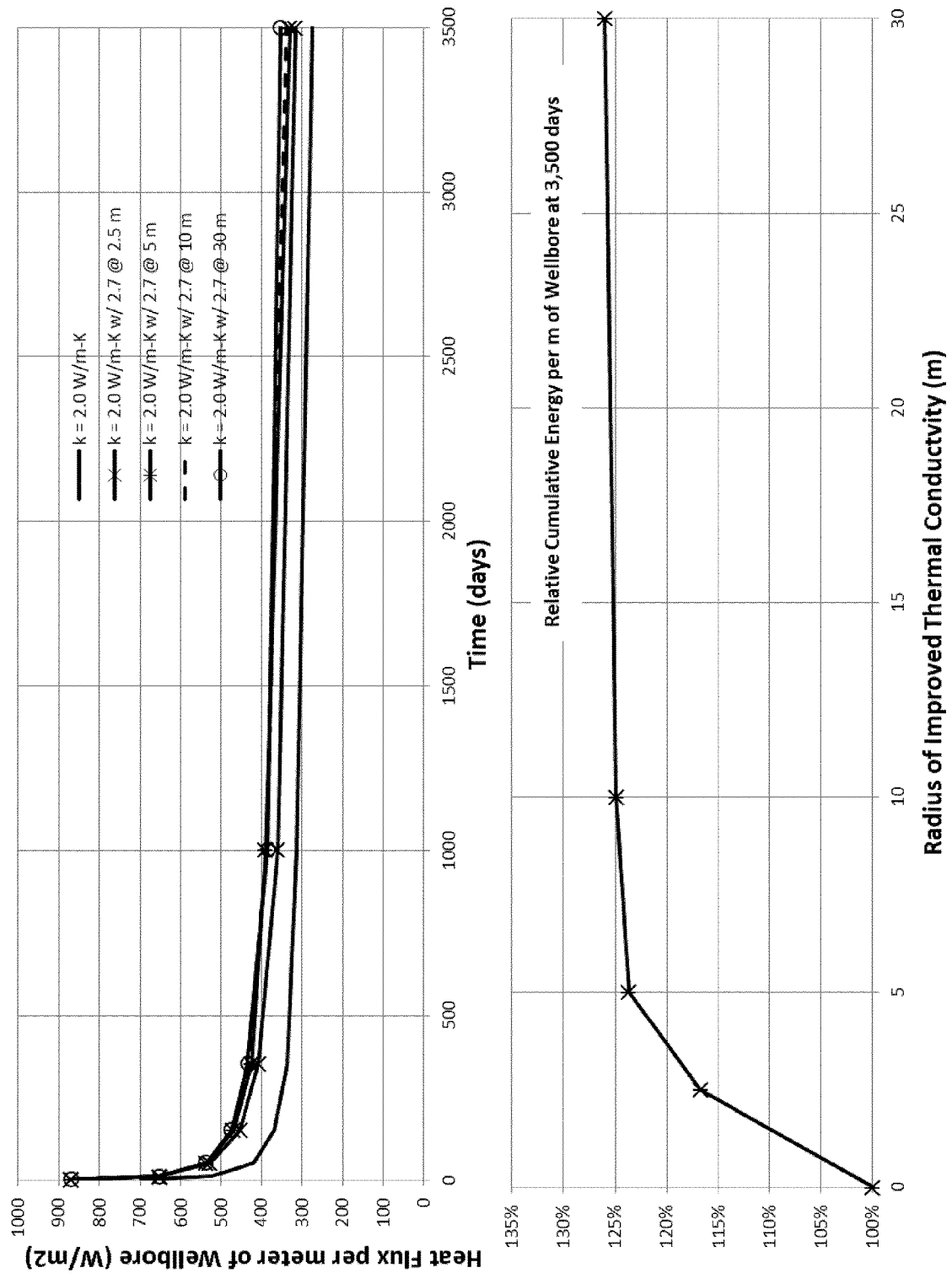
FIG. 8 is a graph illustrating the expected thermal performance improvements achieved by replacement of low conductivity natural gas around a wellbore with water injected during a recompletion method according to an embodiment of the invention.

FIG. 8 illustrates the expected thermal performance improvements achieved by replacing natural gas in porous reservoir rock around a wellbore with a thermal material comprising water. The thermal conductivity of the rock filled with natural gas is set at 2.0 W/m-K. The rock filled with water is set to a thermal conductivity of 2.7 W/m-K. Again, the simulations are based on a horizontal wellbore, in a sandstone reservoir at 120° C. and having 8% porosity rock filled with natural gas. The circulating heat transfer fluid is presumed flowing at a temperature of 36° C. within the wellbore and a wellbore-to-reservoir heat transfer coefficient of 130 W/m$^2$-K. The lower graph shows the effect of natural gas displacement over a radial distance from the wellbore, at 2.5 m, 5 m, 10 m and 30 m with the unaltered condition provided as a baseline. The upper graph shows the heat flow capacity or heat flux for a unit length of the horizontal wellbore with time for each of the conditions. All altered conductivity traces on the upper chart are seen to improve the heat flow capacity over the unaltered base case. A minimally altered radius to 2.5 m shows significant improvement and increasing altered radii continue to show further thermal performance improvements. From this data, the cumulative thermal flow performance improvement relative to the unaltered case at a time of 3,500 days is determined and presented in the lower chart. Review of the results show a 17% improvement in performance with an altered conductivity to 2.5 m radius with a 26% improvement for a value of 30 m. Significant performance improvement is shown up to ~5 m while minimal improvement is seen for radii beyond 10 m indicating an optimum altered radius exists. The impact of an altered radius with performance will vary upon the unique parameters and conditions for each and every well and its application specifics. Also, the radius to alter will vary with each well and its specifics, including economics around cost and captured energy value.

In another embodiment, the thermal performance of the reservoir can be improved beyond that which is native to the reservoir by placing thermal materials having a selected thermal conductivity into the pores, fissures and fractures of the reservoir into selected locations. Such thermal materials may be comprised of high thermal conductivity mixtures comprising particles, solutes, precipitates or slurries. These high thermal conductivity mixtures may be carried into place using gases or liquids and may also contain viscosifying chemicals to enhance transport of contained particles to the desired location, settable or flow resistant chemistry to hinder movement of particles once placed or chemicals to effectively sweep residual hydrocarbons away from the wellbore. The mixture may also contain a chemical to break the created viscosity such that the liquid portion of the mixture may readily disperse following placement, or a chemical to delay the onset of viscosity or a set. The mixture may also contain surface tension reducing surfactants to enhance entry into pores, fissures or fractures for the purpose of entering, filling or sweeping these voids to fully displace hydrocarbon fluids. Selection of the high thermal conductivity material and method of placement into a reservoir will be dependent upon the character of the formation, the properties of the conductive material, the purpose of the placement, the desired result and the economics of the project.

The high thermal conductivity mixture can be placed into the existing voids of highly permeable reservoirs, vugular reservoirs, reservoirs with many natural fissures, or reservoirs with an existing propped fracture network. The high thermal conductive material assists heat flow and is particularly useful in higher porosity reservoirs where lower thermal conductivity of the rock is common. For example, an oil filled sandstone reservoir at 10% porosity is expected to exhibit a thermal conductivity in the order of 2.3 W/m-K while a similar rock with 20% porosity commonly provides a conductivity of about 1.7 W/m-K. In such cases, high thermal conductivity particles of a specific particle size or mesh can be used that avoid bridging or plugging at the entrance to or within the pore throats or cracks, fissures or fractures. Generally for matrix placement, a pore throat diameter to particle diameter ratio of at least 6 to 1 is desired to prevent bridging. For cracks and fissures, an opening width to particle diameter of at least 4 to 1 is preferred. Given the typical range of pore throat diameters or crack and fissure widths within a given reservoir, particle diameters approaching 10 times less than that of the average pore throat or crack or fissure dimension may be required to ensure entry into the majority of void spaces. For sandstone rock at 20% porosity with 50 mD permeability, a typical average pore throat diameter of ~15 um is expected. For the presumed non-bridging dimension ratio of 10:1, a particle size of 1.5 um or about a 1600 mesh powder would be required. A carrier fluid can be readily selected to place a high thermal conductivity material into these larger pores. The pores are of sufficient dimension that capillary pressure and sweep efficiency with water would be effective, possibly including a surface would be acceptable. In one embodiment, a mixture comprising water as the carrier fluid and 1.5 um graphite powder as the high thermal conductivity material should minimize particle settling during placement. This mixture is applied as a 60 vol. % graphite slurry, and is expected to provide a thermal conductivity in the order of 4.4 W/m-K as a suspension. The graphite particles may bridge and pack within at least some of the pore channels, leaving high conductivity packed graphite channel behind the bridge and water filtrate filled channel past the bridge. Within a hydrocarbon filled pore space, displacement of the hydrocarbon and replacement with a packed graphite material may significantly enhance the thermal conductivity. Similarly, the thermal conductivity may be somewhat improved where the hydrocarbon is displaced by suspended graphite slurry or water filtrate. Presuming effective placement of the slurry throughout the full porosity of the pore space for the above described sandstone, the resulting thermal conductivity of the sandstone rock is calculated at 3.7 W/m-K.

Figure 9:
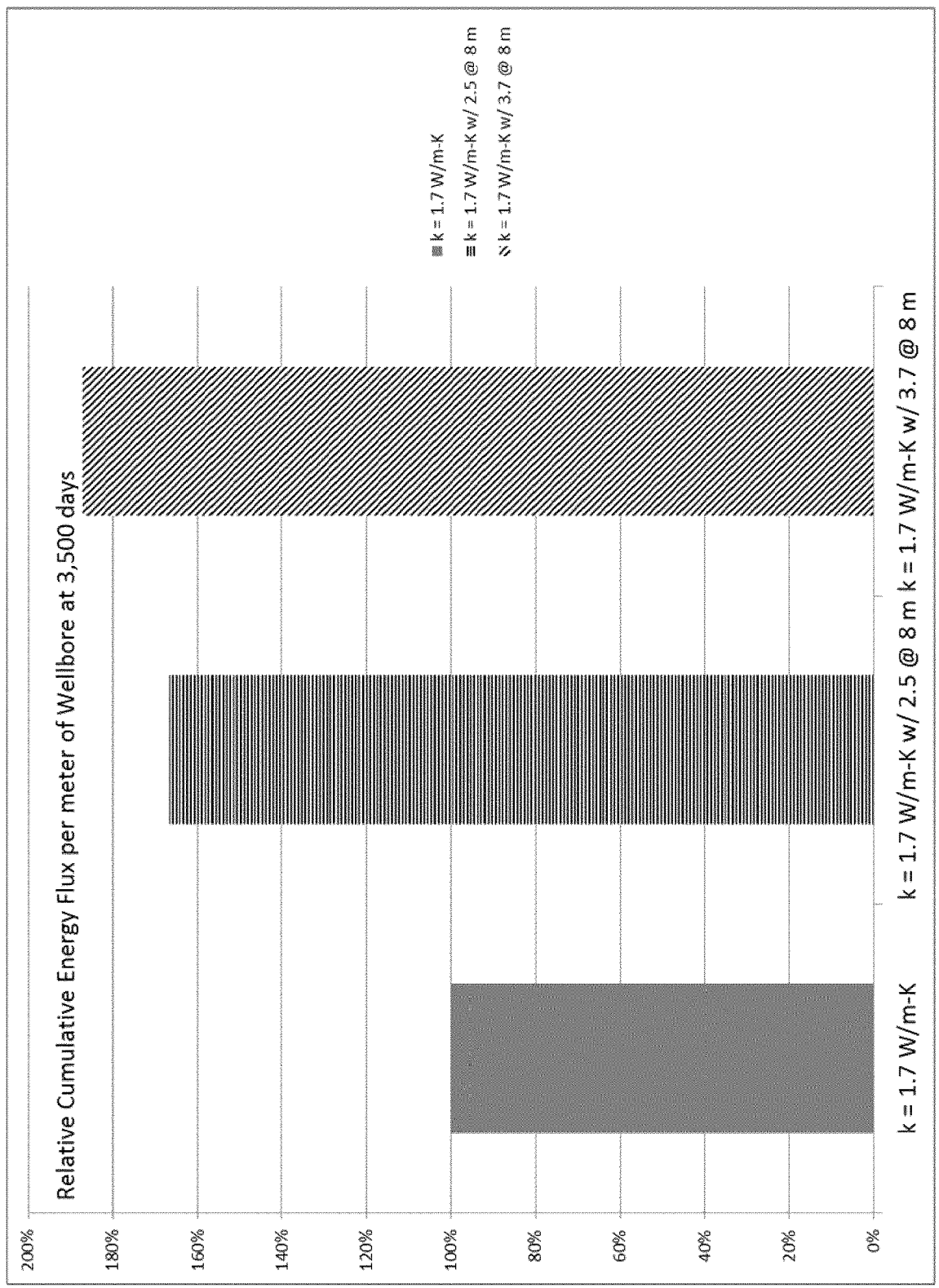
FIG. 9 is a chart illustrating an example of performance gain by enhancing thermal conductivity within the reservoir matrix around a horizontal wellbore according another embodiment of the recompletion method.

FIG. 9 illustrates an example of thermal performance gain by enhancing the thermal conductivity within the reservoir matrix around a horizontal wellbore. A simulation was carried out using sandstone reservoir rock having a 20% porosity and filled with oil, at 120° C., and exhibiting a thermal conductivity of 1.7 W/m-K. The simulation used a circulating heat transfer fluid flowing at a temperature of 36° C. and having a wellbore-to-reservoir heat transfer coefficient of 130 W/m²-K. Thermal performance was simulated to 3,500 days for three conditions. FIG. 9 shows the relative thermal performance of the three scenarios with the unaltered 1.7 W/m-K condition as the baseline (left column). The middle column represents displacing oil from the reservoir rock with water, which enhances rock thermal conductivity to 2.5 W/m-K to a radius of 8 m. The water as the enhanced thermal material provides a thermal performance improvement of over 65% from that of the baseline. The right column represents displacing oil from reservoir rock with 60 vol. % graphite slurry, which enhances the rock thermal conductivity to 3.7 W/m-K to a radius of 8 m. This higher thermal conductivity of the thermal material results in an improvement of almost 90% over the base case and about 15% over water as the thermal material. Of note, the early time performance to 300 days of the scenario which uses graphite slurry as the thermal material (not shown) is almost 30% better than that of the scenario with water as the thermal material.

In another embodiment, the recompletion method can further comprise chemically enhancing the porosity of the reservoir rock near the wellbore to ease placement of the slurry and to permit placement of a larger quantity of high thermal conductivity thermal material around the wellbore, thereby further improving the thermal performance of the well. Chemical enhancement of porosity, such as by acidizing, is a known technique within the oil and gas industry.

In another embodiment, the recompletion method can further comprise injecting thermal materials into the pores of the fracturing sand or proppant within an existing propped fracture network, to create a high conductivity network to improve heat flow to the wellbore. The pores of the fracture network is expected to be predominantly filled with relatively low thermal conductivity reservoir fluids such as natural gas and oil, which in some cases will hinder thermal flow to the wellbore, and the injected thermal material will displace some or all of the low thermal conductivity reservoir fluid. This step is expected to be particularly effective within brittle reservoirs where hydraulic fracturing has created a large stimulated reservoir volume around the wellbore; a dense and interconnected propped fracture network that typically extends tens of meters into the reservoir. Within these fractures, the proppant porosity for these comparatively well sorted and round particles typically approaches 35%. Further, the proppants themselves, often an aluminum oxide material such as bauxite or silicon dioxide as sand, exhibit comparatively high particle thermal conductivity. Particles composed of aluminum oxide and silicon dioxide show thermal conductivities in the order of 30 W/m-K and 6 W/m-K respectively. However, in a tightly packed configuration with proppant porosity at 30%, lower thermal conductivities can be expected. For bauxite with pores filled with natural gas and water, thermal conductivities are expected to be around 5.2 W/m-K and 19 W/m-K respectively. Sand with pores filled with natural gas and water is expected to have thermal conductivities around 1.1 W/m-K and 4.0 W/m-K respectively. In this instance, the bauxite-natural gas fracture system has a thermal conductivity greater than most reservoirs and would be expected to improve the thermal performance over a reservoir that has not been hydraulically fractured. Conversely, the sand-natural gas fracture system is seen to be less thermally conductive than most reservoirs and is expected to hinder thermal flow. In both instances, the fracture systems when filled with water, rather than natural gas, are anticipated to improve thermal flow. The thermal conductivity of the bauxite-water fracture system, at 19 W/m-K, is much greater than that of most reservoirs and should present significant thermal flow improvement. By comparison, the sand-water system thermal conductivity, at 4.0 W/m-k, is relatively low and further thermal conductivity improvement could be considered to improve thermal flow.

Injecting thermal material into a propped fracture matrix is expected to be straightforward given the generally well sorted, rounded and high conductivity properties of the proppant. Packed fracture permeability of 10,000 mD is common and proppant pore throat diameters in excess of 100 um are typical. Further, due to the dimensional consistency of the proppant as a sieved mesh range product, the pore bridging ratio is likely at 6:1 rather than the 10:1 considered for typical cemented sandstone. Within these parameters, placement of 15 um, 400 mesh, high conductivity slurry based thermal material into the proppant porosity can be realized. Again, considering graphite as the high conductivity material, 60 vol % suspended slurry in water is expected to exhibit a thermal conductivity of 4.4 W/m-K. A typical sand proppant pack containing suspended graphite slurry in water, is expected to have a thermal conductivity of 5.4 W/m-K. By injecting a slurry comprising a carrier fluid and graphite as the enhanced thermal material into a propped fracture, the slurry is expected to dehydrate as the carrier fluid flows into the surrounding reservoir permeability or narrow connecting fissures, thereby resulting in a porous graphite solid having a thermal conductivity of about 180 W/m-K. Beneficially, this filtrate will displace gas or oil from the invaded reservoir zone to further enhance thermal conductivity. Packing of the graphite into the sand proppant porosity is expected to provide a significant improvement in thermal conductivity, potentially to 55 W/m-K.

In the above examples, water may be the selected carrying fluid as it also serves to improve the thermal flow over that of the hydrocarbons it displaces as a filtrate or sweep fluid, and may be when applied to suspend a thermal solid supports good conductivity to the resulting suspension, the thermal material. However, the choice of the carrier fluid is dependent upon the particular situation or circumstance. For example, where the objective is to aggregate a thermal solid within a void space, or to place solids within particularly small void spaces, other fluids may prove more effective than water. For example, entry of water into a pore exhibiting a throat diameter of 0.1 um will require a pressure of ~1,000 kPa in order to overcome the capillary threshold pressure and allow water to enter the pore. Without sufficient applied placement pressure, the water will only invade larger pores. Conversely, a liquefied gas, such as carbon dioxide exhibits a capillary threshold pressure in the order of 40 kPa under the same conditions. At a placement pressure of 1,000 kPa, carbon dioxide would enter pores with throat diameters as small as 0.01 um. For a carrier fluid to leak off into a low permeable matrix to leave a high conductivity aggregate behind, the carbon dioxide will much more readily accomplish that. Similarly, to transport particles into smaller dimension pores, the same threshold pressure constraints exist and carbon dioxide will serve to allow entry into much smaller pores than water. However, particle transport capacity of water is superior to that of carbon dioxide as predicted by Stokes Law, based upon viscosity of the carrier fluid. The viscosity of water at downhole application conditions is approximately 10 times greater than that of carbon dioxide to result in a settling velocity that is ten times less. In this manner, water will transport the thermal solids for placement along the wellbore much more efficiently and with less settling than carbon dioxide. Conversely, once in place, settling to aggregate the particles will be much slower with water. Stokes Law also accounts for density differences between the carrier and the particle where settling velocity is reduced as the fluid density approaches that of the particle. Also, in the case of some carrying fluids, upon release of placement pressure the reduction in pressure will result in vaporization of the carrier and much reduced or eliminated threshold pressures to support leak off of the fluid and aggregation of the transported particle. Additionally, some fluids are much more readily and reliably viscosified or able to be set where suspension of the particles is desired. In summary, the carrier fluid is chosen with consideration to objectives that may include or exclude thermal conductivity of the selected fluid. Objectives include particle transport along a wellbore or induced fracture, entry and particle transport into wellbore or reservoir void spaces, leak off from pores to promote particle aggregation and compatibility with chemistry to promote viscosity or set of the carrier. Selected properties of the carrier may include thermal conductivity, viscosity, density, surface tension, phase behavior and compatibility or performance with selected additives.

In some embodiments, and in particular where a reservoir has a relatively small pore throat size, the recompletion method can comprise injecting a thermal material into the reservoir that comprises a solids-free, high conductivity, low viscosity fluid, or a solute containing a precipitating high conductivity solid, or a mixture comprising a fluid and nano-particles. The fluid can be water and surfactants can be included to enhance dispersion into the pores or fissures. Alternatively, the carrying fluid can a low viscosity, low surface tension fluid, such as alcohols, light hydrocarbons, ketones and carbon dioxide. The recompletion method can comprise placing particles with an evaporating fluid or with a gas to maximize penetration and coverage of the reservoir pore network. Notably, suspension of particles within pores is often not needed and viscosifying agents would only be considered for particle transport along the wellbore and to the rock face. The particles can be high thermal conductivity nanoparticles. Suitable nanoparticles include: alumina, copper oxide, magnetite, zinc oxide, aluminum nitride, silicon carbide, copper, silver, iron, aluminum, silica, tin oxide, aluminum copper alloy, silver aluminum alloy, single and multi-walled carbon nanotubes, graphene and graphene oxide nanosheets. Suitable nanoparticles are sized at 10 nm to 100 nm, which allows placement into small reservoir voids with minimal bridging.

In another embodiment, the recompletion method comprises inducing hydraulic fractures in the reservoir formation near the wellbore then placing a thermal material in the created fractures. The thermal material can comprise thermally conductive particles and a carrier fluid, which can be applied and placed deep into the reservoir. In order to create a sufficient fracture width for placement of the thermally conductive particles, the method can comprise first injecting a fluid ("pre-fluid") into the reservoir optionally comprised of a thermally conductive material. The pre-fluid would leak-off from the created fracture to invade the reservoir matrix and increase thermal conductivity in that invaded zone. Additionally, the viscosity of the carrier fluid can be controlled to promote the type of fracture network desired; for example a low viscosity can be selected for a high stimulated reservoir volume (SRV), and a high viscosity can be selected for planar fractures. A high SRV would typically be used to improve general heat flow to the wellbore. Planar fractures might be desirable for bridging low conductivity features within a heterogeneous reservoir; strata such as salt layers or natural fractures containing natural gas.

Different strategies can be carried out to place the thermal material in the reservoir. In one example, following placement by a fracture treatment, deformable particles will collapse with the rock closure stress to create a very low porosity highly conductive path. Closure stresses are in the order of 20 kPa/m; a 3,000 m well will exhibit fracture closure stress at 60,000 kPa and many, if not most, materials will deform or collapse under these stresses. Deformable materials include lead, gold, silver, tin, zinc, aluminum, thorium, copper, brass, hematite, bronze, iron and graphite. With deformation the closed fracture width will be reduced to provide improved conductivity but narrower fracture. Alternatively, hard particles will tend to maintain their bulk porosity to provide a wider but correspondingly lower conductivity fracture. Hard materials include aluminum oxide, silicon dioxide, aluminum nitride, silicon, beryllium oxide and silicon carbide. In these situations, the method can comprise selecting the type of high thermal conductivity particle that is based upon specific well requirements and the method of fracturing undertaken. Common wellbore widths of closed hydraulic fractures are in the range of 10 mm to 50 mm. Particles within the fractures are held in place by the closure stress and once trapped between the fracture walls become immobile. Depending upon density of the particle and carrying fluid transport capacity, the particles might bank along the base of the fracture or be distributed evenly over the fracture height. In designing a fracture for thermal purposes, the conductive path from the fracture to the wellbore is maximized, as a gap in the conductivity path may render the thermal fracture ineffective. Thermal conductivity of the created fractures will be that of porous packed media where the conductivity is dominated by the particle conductivity, the porosity and the interstitial fluid conductivity. For water saturated copper particles within a closed fracture, the stress induced and deformed particle to particle porosity is expected in the order of 10%. With a material conductivity at 395 W/m-K and at the specified conditions, the copper based thermal fracture conductivity is at ~340 W/m-K. For water saturated aluminum nitride in a closed fracture, the porosity will remain little changed from the bulk material at ~30%. The aluminum nitride material conductivity of 320 W/m-K will yield a thermal fracture conductivity of ~200 W/m-K. Both resulting material conductivity exceed typical rock conductivity by roughly two orders of magnitude to provide very high thermal conductive paths. In this manner the conductivity of the created fracture network can be maximized.

Figure 10:
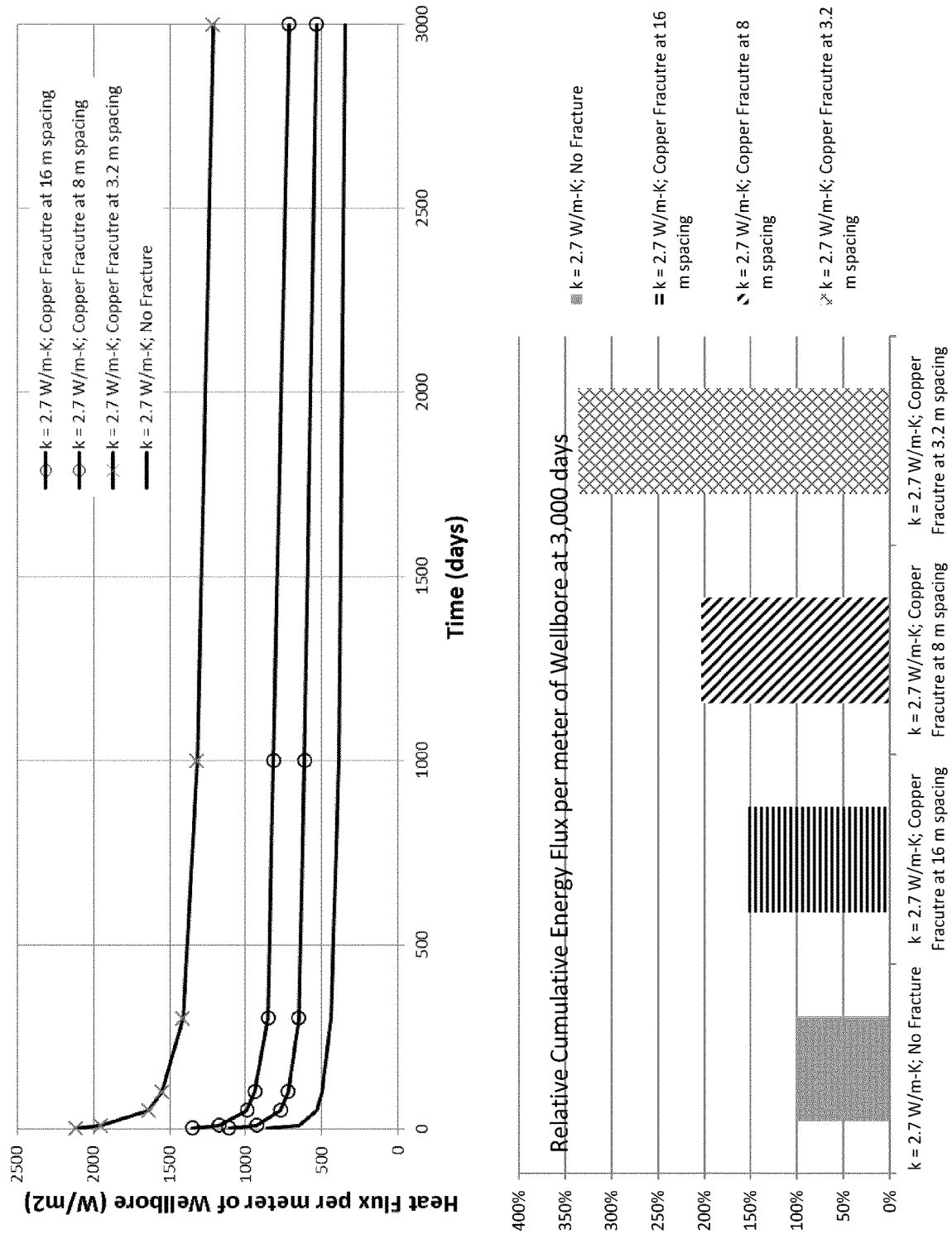
FIG. 10 is a graph illustrating an example of thermal performance gain by hydraulically fracturing a reservoir to place thermal materials within the reservoir according yet another embodiment of the recompletion method.

FIG. 10 illustrates an example of thermal performance gain by hydraulically fracturing a reservoir to place high thermal conductivity thermal materials within the reservoir extent. Consistent with the previous FEA based example, the wellbore is horizontal and the reservoir rock is sandstone, water filled, 8% porosity, at 120 C with a thermal conductivity of 2.7 W/m-K. The circulating heat transfer fluid is presumed flowing at a temperature of 36 C with a wellbore to reservoir heat transfer coefficient of 130 W/m$^2$-K. Thermal performance is simulated to 3,000 days for four conditions. All simulated fractures are radial and perpendicular the wellbore with a radial extent of 10 m. The material within the fractures is that of a copper particle, deformed by fracture closure stress to a porosity of 10% and a closed fracture width of 30 mm. Remaining porosity of the copper is presumed filled with water and a thermal conductivity of 340 W/m-K is set. The conditions are a base case and three different fracture spacing intervals along the horizontal wellbore at 3.2 m, 8 m and 16 m are examined. The upper chart of FIG. 10 illustrates the heat flow capacity or heat flux normalized for a unit length of the horizontal wellbore over time for each of the conditions. The lower chart summarizes the relative cumulative heat flux resulting from the differing fracture intervals to that of the base case (k=2.7 W/m-K; No Fracture). Fracture placement in all cases is seen to improve the heat flow capacity over the unaltered base case. Initial heat flux is improved and the improvement is seen to be sustained over the 3,000 day simulation. From this data the cumulative thermal flow performance improvement relative to the unaltered case at a time of 3,000 days is determined and presented in the lower chart. Review of the results show a 50% improvement in performance at a 16 m fracture interval, with improving performance as the fracture placement interval narrows. Significant performance improvement at over 200% is shown at the 3.2 m fracture interval, however fracture intervals of that density are expected to be impractical. An economic optimum fracturing density is expected to exist. The thermal performance resulting from a specific fracture density will vary upon the unique parameters and conditions for each and every well and its application specifics. Further, differing fracture geometry's, radial, elliptical, or wedge, and extent and width will also impact thermal performance. Optimally designed and placed thermally conductive fractures will vary with each well and its specifics, including economics around cost and captured energy value.

While the illustrative embodiments of the present invention are described in detail, it is not the intention of the applicant to restrict or in any way limit the scope of the appended claims to such detail. Additional advantages and modifications within the scope of the appended claims will readily be apparent to those skilled in the art. The invention in its broader aspects is therefore not limited to the specific details, representative apparatus and methods, and illustrative examples shown and described. Accordingly, departures may be made from such details without departing from the spirit or scope of the general concept.

The invention claimed is:

1. A method comprising:
recompleting a well to produce geothermal energy, comprising:

inserting a hydraulic isolation material into a wellbore of a previously completed well thereby hydraulically isolating the wellbore from an adjacent reservoir while maintaining fluid communication along the wellbore for circulation of a heat transfer fluid;

wherein the hydraulic isolation material comprises a thermal material that displaces a reservoir fluid in the wellbore and thermally couples the adjacent reservoir to the wellbore;

wherein the thermal material has a higher thermal conductivity than the reservoir fluid; and wherein the recompleted well is configured to flow geothermal energy from the adjacent reservoir, through the thermal material of the inserted hydraulic isolation material and into the heat transfer fluid, which is heated and circulated to surface.

2. The method as claimed in claim 1, wherein the thermal material is settable, and recompleting the well further comprises:

placing the settable thermal material into at least one wellbore casing opening that is in fluid communication with the adjacent reservoir, thereby displacing the reservoir fluid from the at least one wellbore casing opening and hydraulically sealing the at least one wellbore casing opening; then setting the settable thermal material such that a fluid impermeable barrier is formed in the at least one wellbore casing opening.

3. The method as claimed in claim 2, wherein recompleting the well further comprises conveying a packer tool to a target location in the wellbore comprising the at least one wellbore casing opening, then circulating the settable thermal material from the packer tool and into the at least one wellbore casing opening.

4. The method as claimed in claim 3, wherein the well comprises an uncemented wellbore casing and a borehole, and recompleting the well further comprises:

circulating the settable thermal material into a borehole annular space between the wellbore casing and the borehole thereby displacing the reservoir fluid in the borehole annular space; then setting the settable thermal in the at least one wellbore casing opening and the borehole annular space.

5. The method as claimed in claim 4, wherein the settable thermal material is selected from a group consisting of cement, polymer, and resin.

6. The method as claimed in claim 1, wherein the hydraulic isolation material further comprises a fluid impermeable mechanical flow barrier that is placed inside the wellbore thereby hydraulically isolating the interior portion of the wellbore from the adjacent reservoir, and the thermal material is a fluid that is placed in between the mechanical flow barrier and a wellbore casing of the wellbore.

7. The method as claimed in claim 6, wherein the mechanical flow barrier is a conduit selected from a group consisting of casing patches, liners, and isolation strings, and the hydraulically isolated interior portion is the inside of the conduit.

8. The method as claimed in claim 7, wherein recompleting the well further comprises:

conveying the mechanical flow barrier conduit to a target location in the wellbore;

placing at least one packer between the mechanical flow barrier conduit and the wellbore casing; and placing a plug-type packer inside the mechanical flow barrier conduit at a distal end thereof, thereby hydraulically isolating the interior of the mechanical flow barrier conduit from the rest of the wellbore.

9. The method as claimed in claim 8, wherein the well comprises an uncemented wellbore and a borehole, and recompleting the well further comprises:

placing the thermal material fluid into a borehole annular space between the wellbore casing and the borehole such that the reservoir fluid in the borehole annular space is displaced.

10. The method as claimed 9, wherein the thermal material fluid is settable, and recompleting the well further comprises:

setting the settable thermal material in the borehole annular space.

11. The method as claimed in claim 1, wherein recompleting the well further comprises, prior to inserting the hydraulic isolation material into the wellbore, placing additional thermal material into rock openings in the adjacent reservoir, wherein the additional thermal material has a higher thermal conductivity than the reservoir fluid.

12. The method as claimed in claim 1, wherein recompleting the well further comprises, prior to inserting the hydraulic isolation material into the wellbore, hydraulically fracturing rock in the adjacent reservoir, then placing an additional thermal material into rock fractures in the adjacent reservoir created by the hydraulically fracturing, wherein the additional thermal material has a higher thermal conductivity than the rock in the adjacent reservoir.

13. The method as claimed in claim 11, wherein placing the additional thermal material in the rock openings displaces reservoir fluid in the rock openings.

14. The method as claimed in claim 1, wherein the thermal material comprises a gaseous or a liquid fluid selected from a group consisting of: water, aqueous solutions, alcohols, light hydrocarbons, natural gas liquids, ketones, ammonia, nitrogen, methane, ethane and carbon dioxide.

15. The method as claimed in claim 1, wherein the thermal material is a mixture comprising a carrier fluid and a solid having a higher thermal conductivity than the reservoir fluid.

16. The method as claimed in claim 12, wherein the thermal material is a mixture comprising a carrier fluid and a solid having a higher thermal conductivity than the rock in the adjacent reservoir.

17. The method as claimed in claim 15, wherein the solid is selected from a group consisting of: oxide ceramics, nitride/carbide ceramics, metals, metal alloys, graphite, graphene, carbon nano-tubes, silicon and silicon dioxide.

18. The method as claimed in claim 15, wherein the mixture further comprises an additive comprising one or more of: settable materials, viscosifiers, surfactants and solutes.

19. The method as claimed in claim 1, wherein recompleting the well further comprises, prior to inserting the hydraulic isolation material into the wellbore, placing an additional thermal material into pores of fracturing sand or proppant within an existing propped fracture network or other stimulated porosity that exists in the adjacent reservoir, wherein the additional thermal material has a higher thermal conductivity than the reservoir fluid.

20. A method of recompleting a completed well in hydraulic communication with an adjacent reservoir into a well configured to produce geothermal energy comprising:

inserting a hydraulic isolation material into a wellbore of the completed well; and displacing a reservoir fluid in the wellbore with the hydraulic isolation material;

wherein the hydraulic isolation material comprises a thermal material having a higher thermal conductivity than the reservoir fluid;

wherein the inserting and displacing hydraulically isolates the wellbore from the adjacent reservoir and thermally couples the wellbore to the adjacent reservoir; and wherein the recompleted well is configured to produce geothermal energy via circulating heat transfer fluid heated by thermally coupling geothermal energy from the hydraulically isolated adjacent reservoir, through the thermal material of the hydraulic isolation material, and into the circulating heat transfer fluid, which heated circulating heat transfer fluid is circulated to the surface.

21. The method as claimed in claim 20, wherein the additional thermal material is a carrier fluid containing nanoparticles selected from a group consisting of: alumina, copper oxide, magnetite, zinc oxide, aluminum oxide, aluminum nitride, silicon carbide, copper, silver, iron, aluminum, silica, tin oxide, aluminum copper alloy, silver aluminum alloy, single and multi-walled carbon nanotubes, graphene, and graphene oxide nanosheets.

22. The method as claimed in claim 19, wherein the thermal material further comprises a carrying fluid selected from a group consisting of water, alcohols, light hydrocarbons, ketones and carbon dioxide.

23. The method as claimed in claim 1, wherein the thermal material has a thermal conductivity that is at least 15% greater than the thermal conductivity of the reservoir fluid.

24. The method as claimed in claim 12, wherein the thermal material has a thermal conductivity that is at least 15% greater than the thermal conductivity of the rock in the adjacent reservoir.

25. The method as claimed in claim 1, wherein the inserted hydraulic isolation material seals wellbore openings to the adjacent reservoir while leaving open an entire wellbore length for circulation of the heat transfer fluid therethrough and to and from the surface.

* * * * *

UNITED STATES PATENT AND TRADEMARK OFFICE
CERTIFICATE OF CORRECTION

| | | |
|---|---|---|
| PATENT NO. | : 11,220,882 B2 | Page 1 of 1 |
| APPLICATION NO. | : 16/472871 | |
| DATED | : January 11, 2022 | |
| INVENTOR(S) | : Grant Nevison and Josh Thompson | |

It is certified that error appears in the above-identified patent and that said Letters Patent is hereby corrected as shown below:

On the Title Page

Item (73), correct the Assignee name to read:
ELEMENT COIL SERVICES INC.

Signed and Sealed this
Tenth Day of September, 2024

Katherine Kelly Vidal
*Director of the United States Patent and Trademark Office*